(12) United States Patent
Sneeringer

(10) Patent No.: US 6,618,709 B1
(45) Date of Patent: Sep. 9, 2003

(54) COMPUTER ASSISTED AND/OR IMPLEMENTED PROCESS AND ARCHITECTURE FOR WEB-BASED MONITORING OF ENERGY RELATED USAGE, AND CLIENT ACCESSIBILITY THEREFOR

(75) Inventor: David J. Sneeringer, Wilmington, DE (US)

(73) Assignee: Enerwise Global Technologies, Inc., Kennett Square, PA (US)

( * ) Notice: Subject to any disclaimer, the term of this patent is extended or adjusted under 35 U.S.C. 154(b) by 0 days.

(21) Appl. No.: 09/222,787

(22) Filed: Dec. 30, 1998

Related U.S. Application Data

(60) Provisional application No. 60/080,604, filed on Apr. 3, 1998.

(51) Int. Cl.[7] .............................................. G06F 17/60
(52) U.S. Cl. ........................ 705/412; 705/400; 705/401; 705/402; 705/403; 705/404; 705/405; 705/406; 705/407; 705/408; 705/409; 705/410; 705/411; 709/217; 709/219; 707/104
(58) Field of Search ................................. 705/412, 400, 705/401, 402, 403, 404, 405, 406, 407, 408, 409, 410, 411; 707/104; 709/219, 217

(56) References Cited

U.S. PATENT DOCUMENTS

| | | | | |
|---|---|---|---|---|
| 4,568,934 A | * | 2/1986 | Allgood | 340/870.02 |
| 4,933,633 A | * | 6/1990 | Allgood | 705/412 |
| 5,301,122 A | | 4/1994 | Halpern | |
| 5,699,276 A | | 12/1997 | Roos | 379/106.03 |
| 6,049,791 A | * | 4/2000 | Lerner | 705/412 |
| 6,088,688 A | * | 7/2000 | Crooks et al. | 705/412 |

FOREIGN PATENT DOCUMENTS

| | | | | |
|---|---|---|---|---|
| US | WO 01/06432 A1 | * | 1/2001 | G06F/17/60 |
| US | WO 01/06612 A1 | * | 1/2001 | H02J/3/00 |
| WO | WO 01/06432 | | 1/2001 | |
| WO | WO 01/06612 | | 1/2001 | |

OTHER PUBLICATIONS

Clark, David. 1998 "POWERLINE COMMUNICATIONS: Finally Ready for Prime Time?" IEEE. pp. 10–11.

Spain, T. Kenneth. 1998. "New Software for New Challenges," No. 7, vol. 23, *Energy User News*, p. 24.

Spaim, T. Kenneth; New Software for New Challenges; Jul. 1998; Chilton Company Energy User News; No. 7, vol. 23, p. 24; ISSN: 0162–9131.*

Energy User News, "New Software for New Challenges" by T.K. Spain, Copyright 1998 Chilton Copany, Energy User News, Jul. 1998.

* cited by examiner

*Primary Examiner*—James P. Trammell
*Assistant Examiner*—Cristina Sherr
(74) *Attorney, Agent, or Firm*—Irah H. Donner; Hale and Dorr LLP

(57) ABSTRACT

A method and computer architecture monitoring resource usage via a global computer network. The computer architecture may include a resource-metering data recorder/translator unit having a global computer network node and, in operation, recording resource usage measured by and associated resource meter. The computer architecture further includes a database and at least one global computer network server, in operation, storing resource usage data recorded by the data recorder/translator unit in the database, receiving a resource usage data query from a user, calling the database for resource usage data relevant to the user, and presenting resource management information based on the relevant resource usage data via a global computer network site to the user. The computer architecture may also include a resource-metering data recorder, in operation, recording resource usage data measured by an associated resource meter, and also includes a recorder translator, in operation calling the data recorder, and transferring the resource usage data from the data recorder to the database.

51 Claims, 11 Drawing Sheets

COMPUTER ASSISTED AND/OR IMPLEMENTED PROCESS AND ARCHITECTURE FOR WEB-BASED MONITORING OF ENERGY RELATED USAGE, AND CLIENT ACCESSIBILITY THEREFOR

RELATED APPLICATIONS

This application claims priority to U.S. Provisional Application Serial No. 60/080,604, filed Apr. 3, 1998 and incorporated herein by reference.

FIELD OF THE INVENTION

The present invention pertains generally to a method and/or a computer architecture for monitoring resource usage via a computer network, and more particularly to a method and/or a computer architecture for monitoring energy usage via local area networks ("LANs") and/or global area networks such as the World Wide Web ("WWW" or "Web").

BACKGROUND OF THE INVENTION

In many states, electricity consumers already have or soon will have choices when they purchase their electricity. The decades-old structure of area-specific monopolies for electricity is being changed under what is called "restructuring" or "deregulation."

Deregulation of the electricity utility in California is given herein by way of illustration. The following discussion, however, is equally applicable to other jurisdictions and other utilities, wherein the utilities are being provided in a substantially free market environment. A California law dramatically changed the regulated market system that had been in place for more than eighty years for serving the electricity needs of California's homes, businesses, industry and farms. The law:

recognized that new technology and new federal laws allowed change from a highly regulated market structure to one that relies on competition to set the price of the generation component of electricity bills;

authorized retail competition, which allows customers to choose their electricity supplier; and permitted new business opportunities to develop in buying, selling or brokering electricity for individual customers or customer groups.

Roughly 80 percent of electricity service in California is provided by three electric utilities owned by private investors and regulated by the California Public Utilities Commission (CPUC). In the old market structure, the investor-owned utilities were granted franchise areas in which they were given the exclusive right to provide electricity service. In exchange for this exclusive right, all aspects of their business have been regulated. The CPUC set the standards for electricity service, authorized utilities to invest in new facilities such as power plants, transmission lines or other equipment as necessary to meet their obligation to provide service to all customers, and set rates that different customers pay for electricity service. Although the CPUC will continue to set service standards and to regulate certain aspects of the new electricity market, much of the market structure will change.

The law essentially treats the major private utilities as having four distinct functions:

1. generation of electricity,
2. transmission of electricity along high voltage transmission lines,
3. distribution of electricity to customers with other customer services, and
4. metering and billing for electricity.

In the past, each of these functions had been performed by a single utility company, subject to regulatory oversight by the CPUC. Under the above-mentioned law, these functions are done partly by the utility company, partly through competitive businesses, and partly by new regulated entities created by the legislation.

Power plant owners have the opportunity to sell electricity to customers with whom they have negotiated sales contracts, to sell electricity into a general "pool" (the Power Exchange, described below) from which large customers and distribution utilities may draw to meet their needs, or to "aggregators," which are firms that have signed contracts with many small customers to provide their electricity needs. Existing private utilities may sell many of their power plants to existing or possibly new power generation firms, and additional power plants will be constructed by power companies that are not utilities, all to assure an adequate level of competition. Thus, competition among potential generators of electricity will set the price for the electricity component of a customer's electricity bill. The role of regulators will be to make sure that competition is allowed to flourish and that no firms can dominate the market and set prices.

The distribution/customer service function, which encompasses moving electricity through a service area to customers, maintaining electricity lines, and providing metering and billing services, will largely remain monopoly activities at this time. The investor-owned distribution utility will continue to be regulated by the CPUC. Some of the services, however, now performed by the distribution/customer service company, such as metering and billing, power conditioning or backup, may be "unbundled" and provided by other private businesses in the future.

A steadily increasing percentage of customers located in the service territories of six of the seven investor-owned utilities will be allowed to shop for power in an open market. Customers will have "direct access" to generators. No longer restricted to buying power only from their local utility company, they should be able to compare one deal to another and pick the one which meets their preferences. I have determined that customer-specific packages of power and other services may advantageously be offered, so that the customer can choose the best overall value that meets their needs. For example, some companies may not need high levels of reliability, while others may need exceptional reliability. Other companies may be able to shift their loads to take advantage of lower prices at certain off-peak times.

For a customer of, for example, one of the six affected investor-owned utilities, I have determined that receipt of offers from competing electricity providers may depend on the amount electricity the customer consumes, either at one location or at all locations under the customer's control. Businesses with multiple locations, such as supermarkets and retail stores, I have determined, may combine the electrical load at all locations and contract with one service provider. At the outset of the restructured market, new electricity providers will likely approach large electricity users first, and smaller consumers later because of the relatively higher cost of signing up a large number of small consumers.

The second major feature of the law is creation of the Power Exchange ("PX"). The PX will accept a request to buy a quantity of electricity at a given price. The PX functions like an auction to match total demand for power with generation of power. The PX will create a "pool" or "spot market" where price information is publicly available. The PX will solicit bids from electricity generators and choose the lowest bidders until the PX has enough supply to meet the requests to buy power. PX prices may even change on an hourly basis. Many customers will pay for electrical power based on this price, either directly through their distribution utility or through a private power supply contract with terms that are pegged to the PX price. Thus, consumers who choose to enter into private contracts for power, where the terms, conditions and price are not public knowledge, may use the public information from the PX to gauge the attractiveness of supply or service offers they receive.

The information that is monitored is, for example, process-related information. For example, the process-related information may include energy or gas consumption, in terms of kilowatt-hours (kWh) on the electric side, or million cubic feet (Mcf) on the gas side. Other types of process-related data may also be used where the process data may advantageously be combined, for example, electricity, natural gas, gasoline, cable television, band width, telecommunications, short distance service, long distance service, water, Internet usage, radio usage, cellular usage, digital data (bits and/or quantities thereof) usage, satellite usage, and the like. Plainly, the instant invention may be adapted to any resource usage that may be monitored. Further, process-related data, as given by way of example above, may be aggregated among multiple users to present to a resource provider a larger than otherwise possible consumer block, which may demand price concessions because of the quantity of resource to be sold to the consumer block. Advantageously, users having complementary resource usage may aggregate their usage requirements so as to provide substantially linear usage requirement over time to a resource provider.

California's efforts to restructure the state's electricity market will accomplish several goals. First, investments in new power plants will be made by those who bear the risk of the investment decision. If a power plant turns out to be uneconomical, the plant investors will suffer the loss. Of course, as in all competitive markets, if the plant is profitable, the investors retain the profits. Second, consumers will have access to many electricity suppliers. They will no longer be restricted to just one supplier, on a "take it or leave it" basis. Prices are negotiable. This will create the opportunity for competition to occur with the likely outcome of falling electricity prices for all consumers once the transition period is finished. Third and most importantly with respect to the instant invention, the restructured market will allow new business opportunities. New firms, selling new products and services will appear.

Customers will be afforded the opportunity to buy their electricity from an Electric Service Provider (ESP) other than the utility that historically provided all elements of electricity service. This is called "Direct Access."

Various promotional and marketing efforts by ESPs will describe the prices and services they offer. In general, ESPs will specialize in providing the electricity commodity ("generation services"). The delivery of electricity to the customer premises ("distribution services") will still be provided by the local utility, known as a Utility Distribution Company ("UDC"). The new ESPs may focus on reducing electricity costs on average, or may offer long-term contracts to provide greater certainty about electricity costs through time, or may promote "green power" from renewable or environmentally-friendly generation sources. Some ESPs will offer electricity meters and metering services, different billing options and information services, in addition to the electricity commodity.

Larger customers will be able to negotiate special prices, terms and conditions that suit their circumstances. For smaller customers, however, the costs of customizing a service contract would likely exceed the profit margin of most ESPs, so these customers will have to "shop around" and select from among the standardized offerings of ESPs the service contract that best meets their needs. Some customers may be able to join "aggregation groups" that form to develop enough group buying power to obtain a better deal than the standardized ESP service offerings. Such aggregation groups may be created by neighborhood or civic organizations, churches, or business or trade associations, and may be able to obtain benefits for their members by "shopping around" and negotiating on behalf of the whole group.

The primary business of ESPs is to provide the electricity commodity. In addition, ESPs are allowed to perform billing services. Depending on which ESP is chosen, a consumer may receive a consolidated bill from the ESP, which includes charges for both the electricity commodity provided by the ESP and the distribution services provided by the UDC. Alternatively, the ESP may choose not to do its own billing, in which case the consumer will receive a consolidated bill from the UDC. As a third alternative, the consumer may receive separate bills from the ESP and the UDC for their respective portions of the consumer's total charges.

ESPs will be allowed to provide electricity meters and perform metering services for residential and small commercial customers. They are already allowed to perform these services for large customers. Once metering and related services become competitive for all customers, one can expect greater variety in the service offerings of ESPs.

Some ESPs may offer to provide natural gas as well as electricity. The gas industry has allowed aggregation of small customers for the past several years, but few small-customer aggregators are active at this time. By allowing ESPs to offer both electricity and natural gas to the same customer, the newly deregulated electricity market may present the customer with a wide variety of energy service combinations.

In view of the above, I have determined that it would be desirable to provide a system and/or method to enable a user to take advantage of the deregulated market for resources by having access to energy management information.

I have also determined that it would be desirable to deliver the energy management information via the Internet. Preferably, the system for providing the energy management system and method for providing the same would be characterized by simplicity of use, openness of communication for ease of use by the customer, system flexibility, and maximum value to the customer.

It is also desirable to have a system and/or method for providing customers with the ability to access, analyze, and display their energy and other process information to optimize their business processes in general, and their energy activities and purchases in particular. To this end, it would be also desirable to provide a system and/or method by which those customers can provide energy brokers and marketers the best operational load information to command the best value for their energy dollars.

"Powerline Communications" by David Clark discloses a communications system, as shown in FIG. 1, that enables the provision of Internet access via electric power lines from utility companies. "Powerline Communications," David Clark, IEEE Internet Computing, pp. 10–11, January–February 1998, incorporated herein by reference. However, Clark makes no mention of use of the system to provide energy usage information to utility users, for example, via the Internet.

U.S. Pat. No. 5,699,276 to Roos, incorporated herein by reference, discloses a utility meter interface apparatus connected between a utility company and a home. Referring to FIG. 2, the utility meter interface includes a utility meter for measuring utility usage and a computer located external to the home. The computer is connected to the utility meter and provides an interface between a communication network and a device located in the home. The computer is adapted to communicate with the device over the home's internal wiring to provide a digital service network over existing home telephone and television lines.

Roos mentions that the electric company may produce a record of both power use and factor by communicating periodically with a meter interface. Roos further mentions use of the utility meter for monitoring utility usage, reporting billing, and managing loads to run equipment at off-peak hours. However, Roos makes no mention, beyond the mere desirability of the feature, as to a system or method for providing such utility usage data. That is, for example, there is no teaching anywhere in Roos of a global and/or local computer network server, in operation, receiving a resource usage data query from a user. Roos further does not describe calling a database for resource usage data relevant to the user, and presenting resource management information based on the relevant resource usage data to the user via a global and/or local computer network interface site.

SUMMARY OF THE INVENTION

It is, therefore, a feature and advantage of the present invention to deliver, an Internet-based open platform information system that provides energy management information and/or service to, for example, commercial, industrial, and/or residential customers.

The premise behind the development and implementation of a system and/or method of providing an energy management information service is simplicity of use, openness of communication for the customer, system flexibility, and maximum value to the customer. In the new electric utility environment in California (and eventually the rest of the country), a premium is being placed on information, and in particular energy information. An Open Platform Information System (OPIS) is the ideal platform for this environment.

OPIS adapts to the dynamic world, including the Internet. Thus, the present invention is able to give customers the information they need to make efficient, profitable purchases in the upcoming energy markets. By obtaining the ability to access, analyze, and display their energy and other process information, customers will be able to optimize their business processes in general, and their energy activities and purchases in particular. It has been established by energy brokers and marketers that those customers that can provide them the best operational load information will be able to command the best value for their energy dollars.

It is another feature and advantage of the instant invention to enable the customer to be able to communicate this information clearly, easily, and in a timely manner to their energy agent. It is also advantageous that the present system and/or method has the flexibility to aggregate customer load information over multiple sites regardless of location for the necessary time intervals. Additionally, the present invention is capable of providing billing, profiling, and forecasting for customers at the "click of a button" and provides both electrical and systems control. Being, optionally, World Wide Web-based, the instant invention takes full advantage Web technology, for example, from HTML through advanced JAVA applets.

Because of these and additional features, the present invention is at the forefront of customer energy information systems by making energy information simple and easy for end-user customers. After all, even the most powerful system is of little, if any, value if the customer does not use it.

More specifically, the instant invention provides a computer architecture for global computer network-based monitoring of resource usage. The computer architecture includes a resource-metering data recorder, in operation, recording, periodically or aperiodically, resource usage measured by a resource meter. The invention further includes a recorder translator, in operation, periodically or aperiodically, calling the data recorder, and periodically or aperiodically, transferring directly or indirectly resource usage data from the data recorder to a database. The invention also includes at least one local and/or global computer network server, in operation, receiving a resource usage data query from a user, calling the database for resource usage data relevant to the user, and presenting resource management information based on the relevant resource usage data to the user.

Optionally, the data recorder includes a modem connectable to a network, a public switched telephone network or a wireless communications network, such as a wireless telephone network. So configured, it is in operative communication with the server, using any number of communication methods, such as direct dial-up or Internet Protocol.

Optionally, the server, in operation, presents the resource management information to a computer network of the user, to the user via a global computer network, and in a downloadable data file.

Further, optionally, the server includes resource management software having at load profiles and/or load tables. The server optionally includes financial management software having at least one of real-time pricing, energy cost calculation, and cost allocation. Rate analysis software is optionally included having rate comparison with variable rate structures and pricing options. The server may further include billing software having billing estimation and/or a billing engine.

Optionally, the data recorder, in operation, records meter identification, data stamp, time stamp, kilowatts, kilowatt-hours, MCF of gas, flow rate in terms of gph, temperature, pressure, volts, amperes, power quality, water low indication, and/or pounds of steam.

The computer architecture optionally includes resource-metering data recorder/translator unit including a computer network node and/or a global computer network node and, in operation, recording periodically or aperiodically resource usage measured by an associated resource meter. The server, in operation, stores the resource usage data recorded by the data recorder/translator unit in the database.

Alternatively, the present invention provides for a method of monitoring resource usage via a global computer network. Resource usage, measured by a resource meter, is recorded, periodically or aperiodically, using a resource metering data recorder. The data recorder is polled, periodically or aperiodically, for the resource usage data. The resource usage data is stored, periodically or aperiodically, in a database. The recording step, the polling step, and the storing step are optionally repeated at regular or irregular time intervals.

A query from a user is optionally received at a global computer network server, simultaneously to the repeating step. When the query is received, resource usage data relevant to the user is retrieved from the database. Resource management information based on the relevant resource usage data is presented at a global computer network site or in a downloadable data file.

Optionally, the determining step, the retrieving step, and the presenting step are repeated at regular or irregular intervals.

The recording step optionally includes recording one or more of a meter identification, data stamp, time stamp, kilowatts, kilowatt-hours, MCF of gas, gph, temperature, pressure, volts, amperes, power quality, water low indication, and pounds of steam.

Optionally, the inventive method includes using a server, which has resource management software having at least one of load profiles and load tables, and/or financial management software having at least one of real-time pricing, energy cost calculation, and cost allocation, and/or rate analysis software having rate comparison with variable rate structures and pricing options, and/or billing software having at least one of billing estimation and a billing engine.

Alternatively, the instant invention provides for a computer architecture for global computer network-based monitoring of resource usage. The inventive computer architecture includes a resource-metering data recorder/translator unit having a global computer network node and, in operation, recording, periodically or aperiodically, resource usage measured by an associated resource meter. The computer architecture also includes at least one global computer network server, in operation, storing resource usage data recorded by the data recorder/translator unit in the database. The network server receives a resource usage data query from a user, calls the database for resource usage data relevant to the user, and presents resource management information based on the relevant resource usage data via a global computer network site to the user.

Optionally, the data recorder/translator unit includes a modem connectable to a public switched telephone network or a wireless communications network, such as a wireless telephone network. So configured, the data recorder/translator unit, in operation, communicates with the server using standard communication methods such as direct dial-up, Internet Protocol, or a publish/subscribe network communication protocol.

Optionally, the data recorder/translator unit includes a World Wide Web site, which in operation displays at least one of the resource usage data recorded by the data recorder/translator unit and the energy management information.

Optionally, the server, in operation, presents the resource management information to the user via a local open network, and via the global computer network, or in a downloadable data file.

Optionally, the server includes at least one of resource management software having at least one of load profiles and load tables, and/or financial management software having at least one of real-time pricing, energy cost calculation, and cost allocation, and/or rate analysis software having rate comparison with variable rate structures and pricing options, and/or billing software having at least one of a billing estimator and a billing engine.

Optionally, the data recorder/translator unit, in operation, records at least one of meter identification, data stamp, time stamp, kilowatts, kilowatt-hours, MCF of gas, gph, temperature, pressure, volts, amperes, power quality, water low indication, and pounds of steam.

Optionally, the computer architecture further includes a resource-metering data recorder, in operation, recording, periodically or aperiodically, resource usage data measured by an associated resource meter. The computer architecture optionally includes a recorder translator, in operation, calling, periodically or aperiodically, the data recorder, and transferring, periodically or aperiodically, the resource usage data from the data recorder to the database.

Alternatively, the instant invention provides for a method of monitoring resource usage via a global computer network. Resource usage data measured by a resource meter is recorded, periodically or aperiodically, using a resource usage data recorder/translator unit. The recorded resource usage data is published, periodically or aperiodically, on a network, such as a local and/or global computer network via a publish/subscribe network communication protocol, using the data recorder/translator unit. At least one local and/or global computer network server subscribes to the published resource usage data, periodically or aperiodically. The subscribed resource usage data is stored, periodically or aperiodically, to a database. The recording step, the publishing step, the subscribing step, and the storing step are repeated at regular or irregular time intervals.

The server optionally determines whether a query from a user is received simultaneous with the repeating step. When a query is received, resource usage data relevant to the user is retrieved from the database. Resource management information based on the relevant resource usage data is presented to the user at a personal computer, work station, local and/or global computer network site or in a downloadable data file. The inventive method optionally further includes the step of selectively repeating the determining step, the retrieving step, and the presenting step.

The recording step optionally includes recording at least one of a meter identification, data stamp, time stamp, kilowatts, kilowatt-hours, MCF of gas, gph, temperature, pressure, volts, amperes, power quality, water low indication, and pounds of steam.

Optionally, the inventive method includes a server, which includes at least one of resource management software having at least one of load profiles and load tables, and/or financial management software having at least one of real-time pricing, energy cost calculation, and cost allocation, and/or rate analysis software having rate comparison with variable rate structures and pricing options, and/or billing software having at least one of billing estimation and a billing engine.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way. These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

DETAILED DESCRIPTION OF THE BEST MODE OF THE INVENTION

Figure 1:
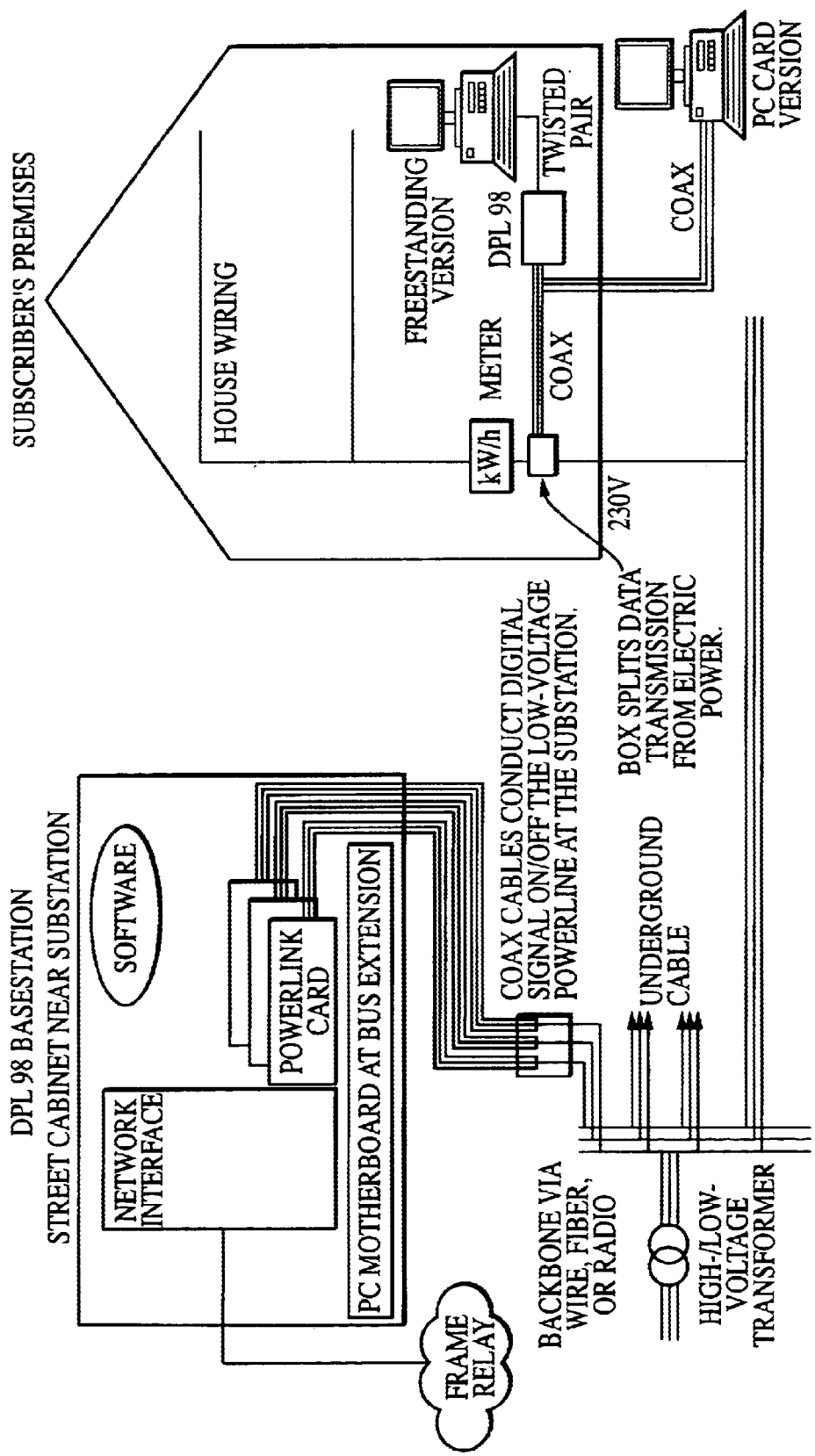
FIG. 1 is a schematic of a prior art communications system.
Figure 2:
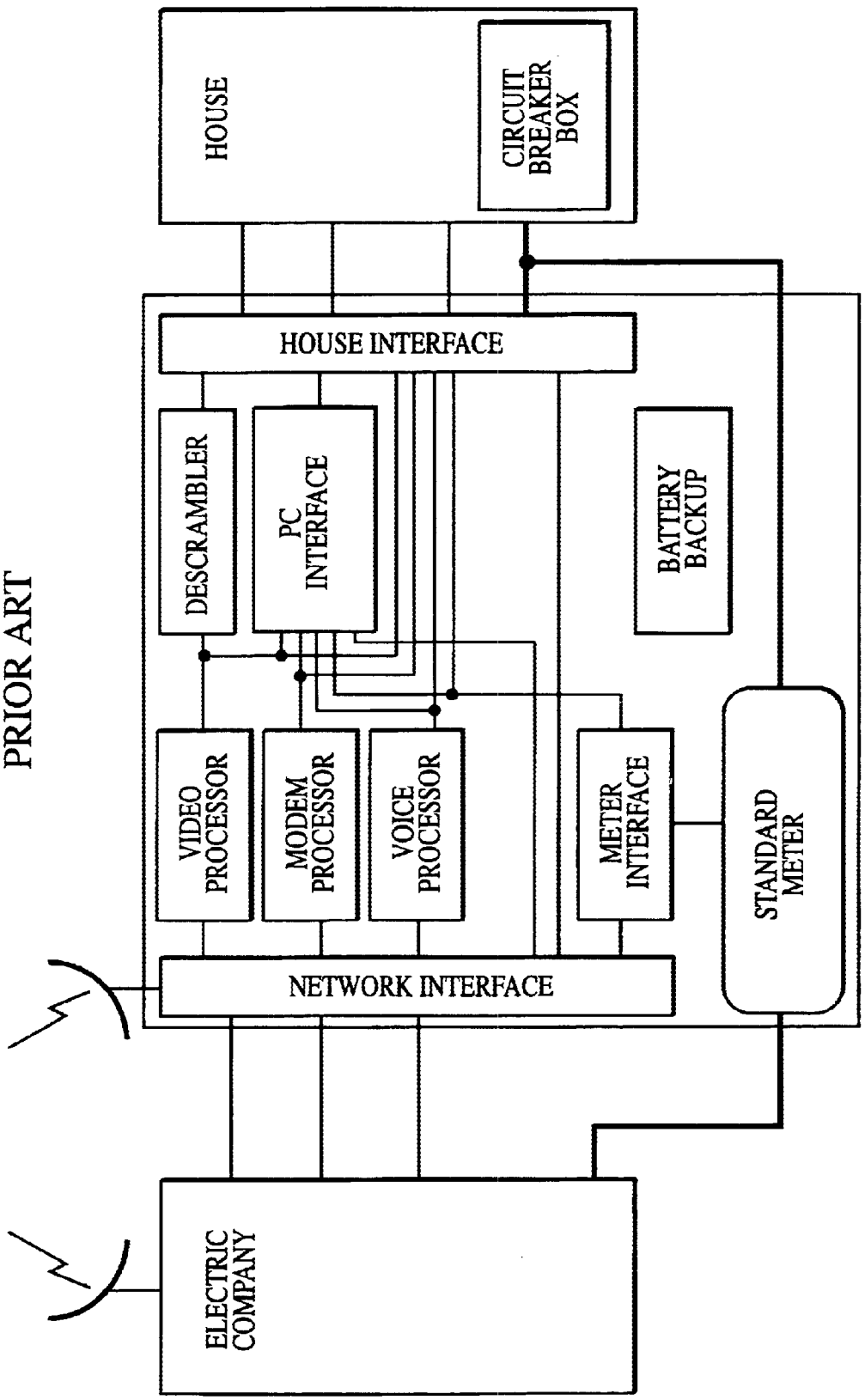
FIG. 2 is a schematic of a prior art utility meter interface apparatus.

The instant invention includes an Open Platform Information System (OPIS) and an Energy Management Information System (EMIS).

Open Platform Information System Architecture Overview

The Open Platform Information System is rooted in the principles of Total Quality Management as practiced by successful operations management. The goal is to help firms improve their level of profitability via intelligent process monitoring and control. It began with the premise of creating an information system that enables customers to gather, analyze, and present meaningful process information anytime, anywhere. It was realized, early on, that a new kind of information technology business is emerging.

OPIS is unique and is used for activities such as load and energy information, billing information, and/or cost allocation. Customers are also achieving significant savings in their acquisition and usage of energy via the present invention. It is believed for a system to be successful—success defined as the ability to bring value to the end-use customer—the service and/or product must address four criteria:

Ease of use

Ease of information, ability to understand/act upon

Responsive to customers' needs

Scalability

Ease of Use: If a system is not utilized, it is of no value. Because OPIS is Internet/WAN/LAN based or other open data protocol, it can be used anywhere, anytime and on any platform where there is connectivity.

Ease of Information: It is the mission to develop and support leading edge information systems that create measurable value for those that use it with minimal work by those that manage it. The EMIS/OPIS system focuses the customer on the relevant information, not the process required to get it.

Responsiveness to Customers' Needs: One of the operational tenets of EMIS/OPIS is to provide solutions faster than the competing information services. This is accomplished through forward thinking and putting the concept in front of the customer better, sooner, faster than the competition, and then acting on feedback from the customers.

Scalability: OPIS draws upon the technologies of the rich and diverse computing environment, which ranges from individual workstations and departmental NT servers all the way up to clusters of ultra high end servers, such as, Sun Enterprise Servers, and mainframes, such as, IBM mainframes. OPIS optionally incorporates a Hewlett-Packard Vantera-type information bus which utilizes the same messaging technologies, i.e., publish/subscribe as Wall Street does to process several hundred million trades a day. Other comparable alternatives may also be used.

The OPIS system was founded, in part, on the concept that the customer owns the energy information specific to their locale or operation. To enable the information to be utilized in a manner that is highly customer friendly, OPIS was designed to take full advantage of the most ubiquitous open information system available today, for example, the Internet.

The need for consumers to have quick and accurate process information to help optimize those operational processes has been the keystone in the field of Total Quality Management, for almost a century. The fathers of modern process management and control, such as W. Edwards Deming, Walter Shewart, and others, consistently stress the informational data requirements as the starting points for process optimization.

OPIS provides the user with operational process information in an easy-to-use, easy-to-understand manner to help firms optimize their processes and subsequently, become more profitable. Because of the inherent concept of "Open Systems", OPIS incorporates a variety of input systems for accessing process data, and is a flexible, user-friendly platform for delivering a variety of information "packages" to the customer. The use of public switched telephone network (PSTN) and, for example, the Internet as possible means of accessing and delivering the information to the customer completes the loop of operational information delivery.

This business model incorporates the fact that different segments have different needs for products and/or services that are delivered through the information system, described here as OPIS. By uniquely subscribing to the concept of OPIS open systems, OPIS eliminates barriers to data transportability and systems integration for the end-user. Business support in this model requires low barriers to entry, and needs to accommodate as many systems as possible. In contrast, locking into a single technology limits the amount of information a customer can get and typically raises the price to the customer. The key is information transferability—openness. What is attempted is high barriers to exit, a primary one being that the value of the system is so high that the customer does not want to leave it.

Customer size, complexity, needs, and wants may optionally determine the design configuration. A key to success for this is mass customization in how OPIS is employed to provide customer specific features/functionality. The ability to process large amounts of information in a manner that is customized to each site or customer brings value to the customer.

There is therefore a need to determine the type, flow, and level of detail of information the customer wants. One concept of the present invention is to provide operational information that will allow the customer to run their business better. Monitoring and control information, as a product, is the physical system to allow the customer to get the information they want, and as a service, is quality control skills and insights into the operations of the firm's operation processes to enable a customer to perform better in business, not necessarily to be the fix itself.

One goal of the present invention is to provide information inexpensively for more effectively executing business. A natural outgrowth of this is for OPIS to encompass facility coordination and consultative services—as part of a full service platform. Although OPIS provides the customer with requested information regarding core operations, OPIS handles information acquisition, required analysis, and information delivery to help the customer become as efficient as possible in operations of concern. Typically the customer will determine how to best run its business, and once it has the necessary information, it will be able to do that intelligently. Additionally, OPIS facilitates the monitoring, analysis, information delivery, and control of ancillary operations, which are a burden to the customer's core activities. These ancillary operations draw attention, people, and resources away from full focus on the customer's core business.

Figure 3:
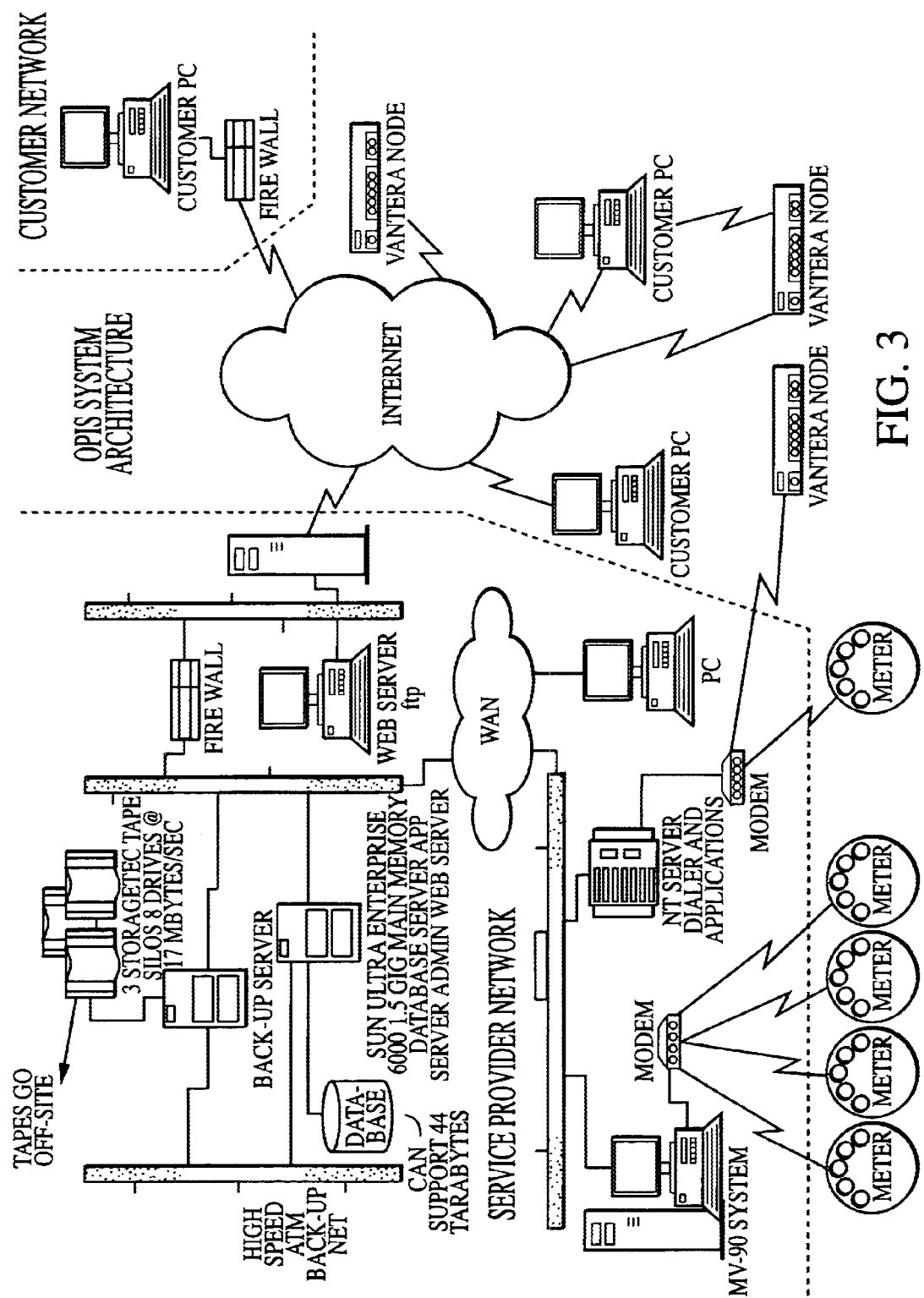
FIG. 3 is a schematic of a preferred embodiment of the instant invention.
Figure 4:
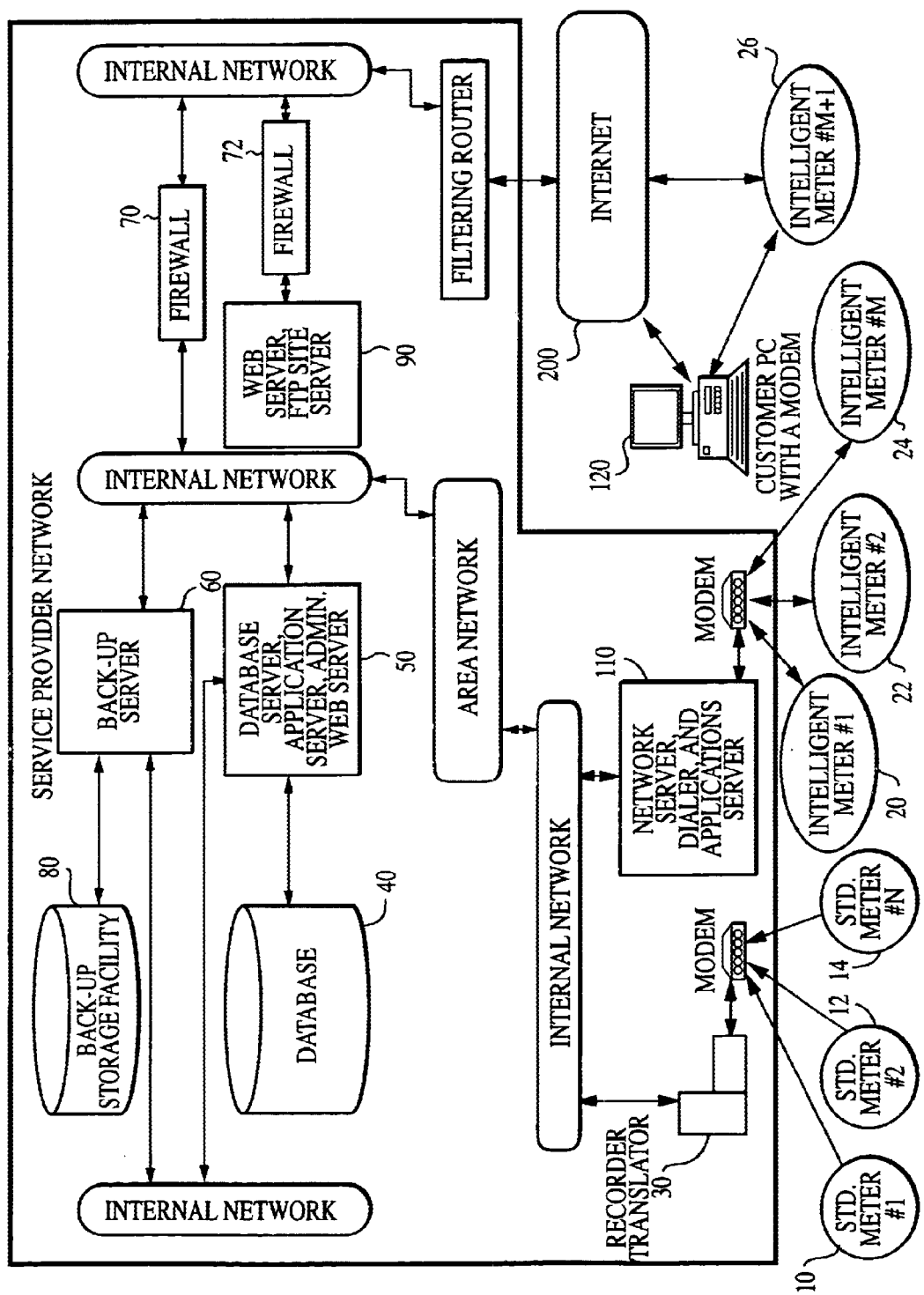
FIG. 4 is a generalized or conceptual schematic of the preferred embodiment shown in FIG. 3.

FIG. 3 is a schematic illustration of the OPIS architecture. FIG. 4 is a schematic derived from FIG. 3, but having more generalized components. The system relies on the integration of various components including hardware and software servers, node and recorder information acquisition, applications software, database engines, firewall and SSL security, production back-up systems, and/or applications interface software. The configuration is network-based and optionally utilizes the Internet as an exemplary primary interface with the customer for information delivery.

Meters

In the Open Platform Information System (OPIS) architecture illustrated in FIGS. 3 and 4, the customer gathers or collects the information, which is then compiled into the system and then gets presented back to the customer. FIG. 4 depicts end-use collection devices including standard utility meters 10, 12, 14, and/or intelligent meters 20, 22, 24, 26. Such standard utility meters 10 may include, for example, Power Measurement's 7700 ION load profile data recorder. Such intelligent meters may include, for example, Hewlett Packard's Vantera nodes. The system has the ability to dial out to these standard meters 10, 12, 14 and/or intelligent meters 20, 22, 24, 26 using, for example, either public switched telephone network (PSTN), and/or the Internet with Internet Protocol (IP) addressing, to Vantera nodes. In addition to or alternatively, other standard end-use collection devices may be used.

The primary function of the meter information or the recorder information is to capture information from a measurement device and to store the information. Once the information is stored, the information is captured from the recorder. An intelligent recorder/meter, such as a Vantera-type node, has all the capabilities of a standard load data recorder. That is, the Vantera-type node, in addition to collecting the information, can, for example, send control signals. By way of illustration, the Vantera-type node or other intelligent node may include a predetermined value that indicates "above some level, take some action," for example, send a signal. In addition, the Vantera-type node can actually serve up or react responsive to, its own web page. So, the customer can dial into the web page directly accessing the Vantera-type node, instead of dialing into the service provider network to access the web page.

The Vantera-type node is, for example, a PC and has, for example, a megabyte of flash memory. One of the applications that is on the Vantera-type node, is a web-serving device. So, the Vantera node, itself, can be accessed directly through, for example, a modem or indirectly through the Internet 100. Normally, the information on the Vantera-type node is accessible via telephone or other standard communication technique. The Vantera-type technology provides the capability of accessing over, for example, Ethernet, or other networks. However, some customers may not like such access, either because they have to interact with their own information technology (IT) departments, or they just feel there might be a security issue. A PCMCIA may alternatively be provided in the Vantera-type node itself, and may be used to access the nodes.

A Vantera-type node is called, for example, every hour, to obtain the information just as any other meter or recorder. However, if the customer wants the information in real-time, where the customer wants to see specifically what is presently happening, the customer may dial the node up itself and initiate a communication session with the node via the direct phone line into the node using, for example, the standard web browser in the node. No contact with the Internet 100 is necessary.

Every Vantera-type node has its own IP address. The Vantera-type node indicates its IP address or similar location information to a customer or sends back to the customer a URL or other locator for the node. The customer then accesses that web server on the Vantera-type node itself to see the information, for example, in real-time. A customer may look at the data history to the extent permitted by the amount of available storage on the node itself. However, if the customer wants to see something current, or over the past couple of days, the customer may take a look at that information in this manner. After the customer has finished accessing the Vantera-type node and read the node for utility data when the customer is off-hook, the collected data is available for analysis. Thus, the present invention advantageously permits optional real-time access to users, while also collecting the information over time, without losing the information, for analysis.

The information that is monitored is, for example, process-related information. For example, the process-related information may include energy or gas consumption, in terms of kilowatt-hours (kWh) on the electric side, or million cubic feet (Mcf) on the gas side. Other types of process-related data may also be used where the process data may advantageously be combined, for example, electricity, natural gas, gasoline, cable television, band width (copper, optical fiber, etc.), telecommunications, short distance service, long distance service, water, Internet usage, radio usage, cellular usage, digital usage, satellite usage, and the like.

Plainly, the instant invention may be adapted to any resource usage that may be monitored. Further, process-related data, as given by way of example above, may be aggregated among multiple users to present to a resource provider a larger than otherwise possible consumer block, which may demand price concessions because of the quantity of resource to be sold to the consumer block. Advantageously, users having complementary resource usage may aggregate their usage requirements so as to provide substantially linear usage requirement over time to a resource provider.

Service Provider Network

Typically, a standard fuel unit measurement in, for example, million cubic feet may be accessed via a standard recorder translator 30, such as MV-90, manufactured by Utility Translation Systems. By way of illustration, MV-90 is a universal recorder translator that allows utilities to retrieve and analyze data from metering equipment of substantially all major manufacturers for revenue billing, load research, and system analysis applications. A standard recorder translator, such as, the MV-90 system queries almost any type of low data recorder that is in the field today used by just about every electric utility. This supports the concept of the open platform, which underlies the instant invention, by providing the ability to look at a variety of end-use collection devices that are used by utilities. Collection device interrogation may occur at any desired interval, for example, hourly or daily. One specific process for customers is that, for example, every hour a phone call to the recorder is made to access the previous hour's energy or load information. Other interval collections may also be used.

The data is returned to the MV-90, for example, which serves as a retrieval and translation mechanism in a sense that it brings back the information as the recorder translates the information into engineering units, such as KWh, a standard unit of measurement for electricity or kr, a standard unit of measurement for oil, for example. The MV-90, for example, collects information that is a component of energy usage or other form of chargeable usage, and may then optionally deposit that information via an FTP file transfer to a database 40.

The database 40 is on a standard server, for example, a small Sun Sparc 50 or other remote location. The database 40 is optionally an MSQL , MYSQL, mini sequel server MiniSQL, or Oracle. Information is stored in the database 40, presented to customers, and optionally stored and backed up by a back-up server 60, periodically or aperiodically, for example, every night along with all other data in the servers that are behind the corporate firewall 70 into a back-up storage facility 80. Back-up storage facility 80 comprises, for example, one of three tape silos that are also used to back up the entire network every night. Data security of customers data is advantageously maintained. The information flow for the Vantera-type node information is similar. In general, the data that was run through MV-90, for example, will eventually get stored, for example, on a platform which may, for example be UNIX-based.

The database 40 is in, for example, a UNIX format, but other standard data formats may also be used. Windows NT, for example, is used to access the HP Vantera-type products, but other standard operating systems may also be used. But, eventually that data then gets translated also and drops into the UNIX database, via, for example, a UNIX translator, or other data format translator, if needed. A file format may be created that sets out for a given timetable load information, time, an identifier, a psuedo identifier such as a name or a mute number, and/or the actual data intervals of information.

Once it is read by the dialer on the NT side, the information then may be sent, for example, by file transfer protocol ("FTP'd") or other transfer protocol in the same or similar file format as comes out of for example, an MV-90 such that it is transparent to the database 40 where the information is coming from. All the information then gets stored in the MSQL-type database, or optionally, an Oracle-type database. Optionally, database 40 includes a conversion system capable of receiving data in various standard formats.

On the information distribution side from the customer's perspective, the customer may always go via the public Internet or other suitable network and look at its specific information at any time from any location as long as it has Internet or other suitable access. For example, the customer opens its standard web browser, goes to the address that is specified for its load data, and optionally fills out a user ID to log on, and a password to identify it as the specific user or the specific customer of that particular information. This information is entered to access the entire set of load data, or a portion thereof, collected over time for at least one of the site or sites that may be remotely located from each other, for example, in different states and/or countries of the world, particular or relevant to that customer.

Information may be, for example, collected since January 1 of a given year and can go back all the way to January 1 of the previous year. Once this information is accessible, it may be presented in whatever time period the customer wishes to see or analyze in terms of a load profile of that information showing load characteristics, including amount, duration, periodicity, standard deviations of usage on a periodic or aperiodic basis, and the like.

Optional first firewall 70 is used to secure at least the database 40. The web server and/or FTP server 90 are optionally outside the firewall. Optionally, customers cannot directly access database 40 itself. Thus, for example, the customer issues a query to the web server 90, which then calls for or retrieves the data, which in turn transmits the data through the application server 50 (optionally, the same server as the database server) which is then presented to the customer.

Optionally, security of the networks is as tight as possible such that the data, not only customer data, but any information which is beyond the firewall 70 is always protected against any kind of potential intrusion. Thus, data from the Web server 90 has to go through optional first firewall 70 as well.

Optionally, a second firewall 72 may be placed in front of the web server 90. The customer or other authorized user ("customer"), once at the web site, can move or navigate around to the various pages that comprise an energy management information service according to the instant invention, which sits on the OPIS platform. The customer, and, indeed, multiple customers concurrently can look at the same information. Advantageously, having this system on the Internet enables customers at various locations throughout an area of the country or the world, to actually come to the same site at the same time and enter into a discussion or talk group as to what they are seeing, what it means, and maybe what they can do with that information.

The present invention, therefore, helps troubleshooting, by providing an understanding, for example, of the quality of energy or the electric service that is being provided, such as, voltage fluctuations and/or momentary spikes. Customers thus are provided the ability to do analysis, e.g., power quality analysis, over the Internet or other suitable network that is able to capture their resource usage in various different forms, for example, natural gas, gasoline, electricity, propane, band width, cable television signals, cellular communications signals, local telephone service, long distance telephone service, Internet usage, satellite signals, and the like. So, for example, a consultant such as an engineer, may be in Delaware and the site may be in Ohio. The engineer may look at the information, do analysis, and perhaps even resolve an issue without ever going to the site. The types of information that the customer may see, include, for example, the load in energy, the actual building layout/structure, historical bills, and/or a forecasting component that helps forecast the amount of energy a customer may use based upon a forecast for a given location or a given customer site. Optionally, the instant invention includes a front end that displays news and weather and industry-specific information so that a particular customer may track the customer's particular industry, for example, by standard linking to public Internet sites.

Advantageously, the customer is provided the capability of downloading any piece, part or all of the data that the instant invention has collected or calculated for it. So, any piece of stored load information is, optionally, always available to the customer, for example, by simply requesting a flat ASCII file download feature. Thus, if the customer requests such information, for example, from January through March of a particular year, the customer will receive all of that information, optionally along with associated price estimates.

The standard "File, Save as" facility in standard browsers may be used to save the information, for example, to a local PC, and then imported into a standard spreadsheet or database for analysis. A further advantage of the present invention is that all of the data is firewalled off from anybody making intrusion of getting into or accessing the data.

Operation of the Instant Invention

Figure 5:
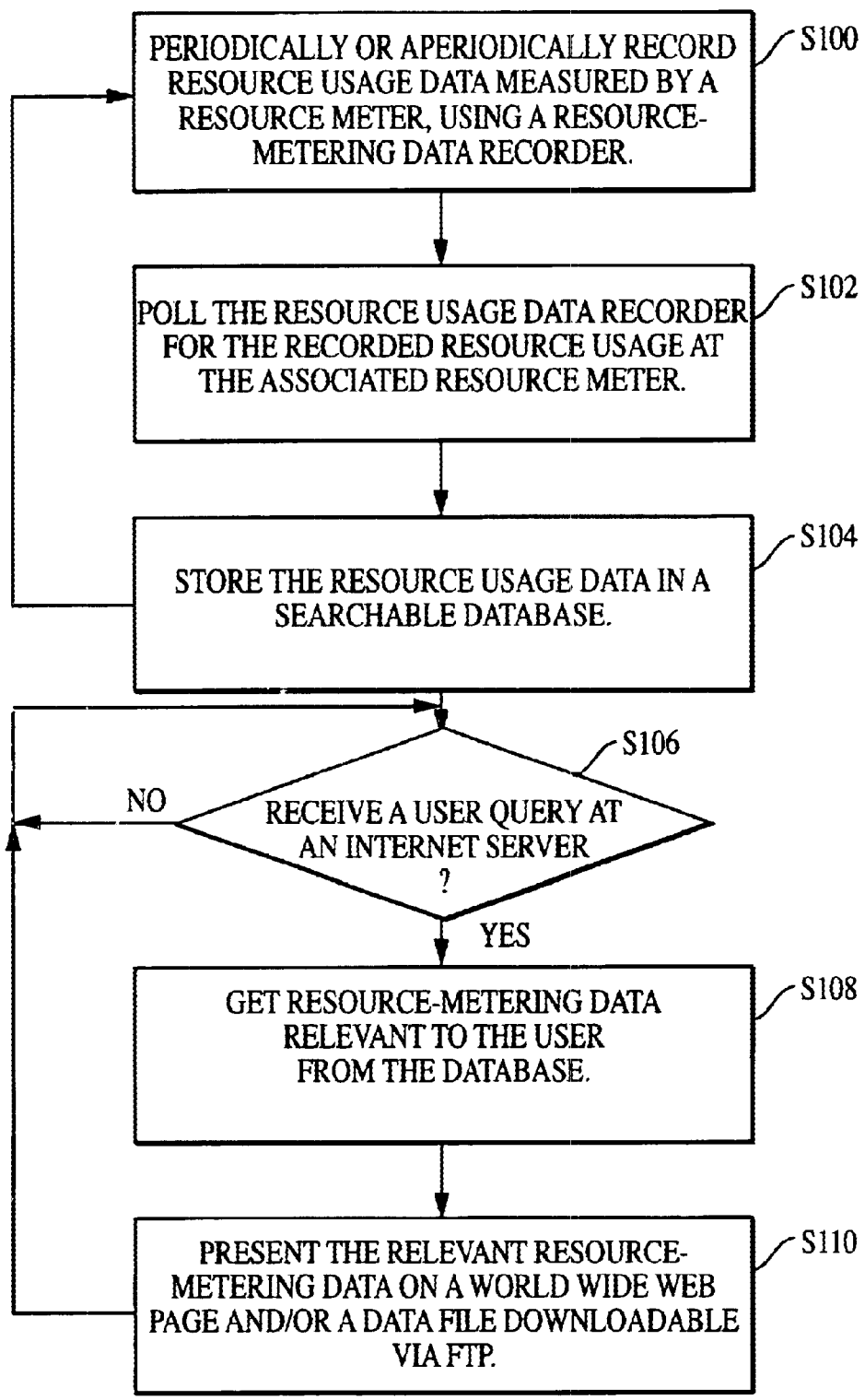
FIG. 5 is a method according to the instant invention.

Referring to FIG. 5, operation of the instant invention according to an exemplary embodiment is described as follows. In Step S100, a resource-metering data recorder 10, 12, 14 periodically or aperiodically records resource usage data measured by one or more resource meters, which is responsively connected to one or more resource consuming devices. In Step S102, the resource usage data recorder is polled, for example, by a recorder translator 30, for the recorded resource usage at the associated resource meter(s). In Step S104, the resource usage data is stored in a searchable database 40.

In Step S106, the Internet server 90 determines whether a user query has been received. If no query has been received, the server may wait. If a query has been received, in Step S108, resource-metering data relevant to the user is retrieved from the database 40. In Step S110, the relevant resource-metering data is presented or transmitted to the user via a World Wide Web page and/or a data file downloadable by FTP.

Figure 6:
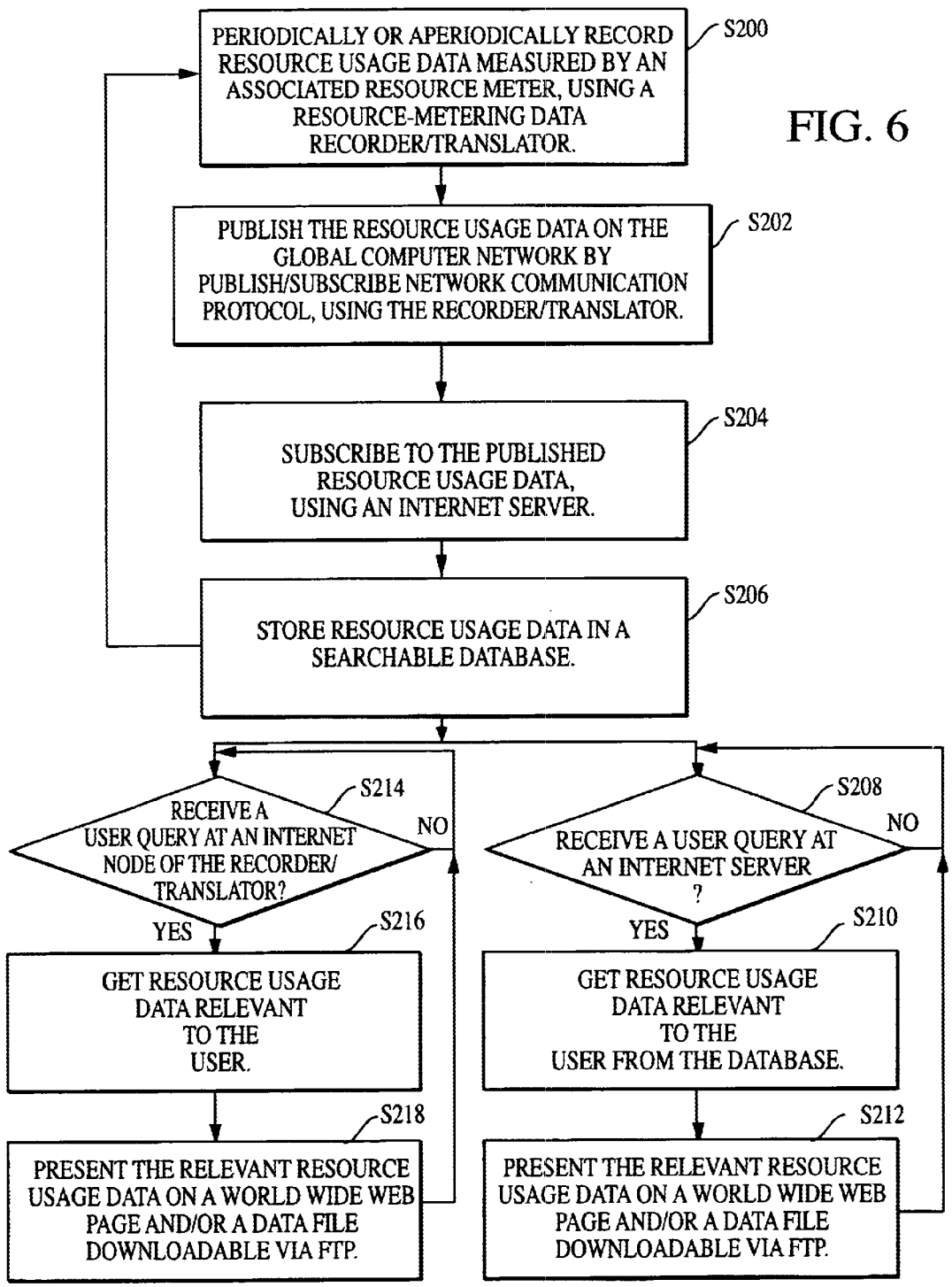
FIG. 6 is another embodiment of the method according to the instant invention.

Referring to FIG. 6, operation of the instant invention according to an alternative embodiment is described as follows. In Step S200, a resource-metering data recorder/translator unit, i.e., an intelligent meter 22, 24, 26, periodically or aperiodically records resource usage. In Step S202, the data recorder/translator unit publishes the resource usage data on a global computer network, for example, the Internet 200, using standard publish/subscribe network communication protocol. In Step S204, an Internet server 110 subscribes to the published resource usage data. In Step S206, the resource usage data is stored in a searchable database 40.

In Step S214, the data recorder/translator unit determines whether a user query has been received at its Internet node, for example, its World Wide Web site. If no such user query has been received, the data recorder/translator unit may wait. In Step S216, if a user query is received, the data recorder/translator unit retrieves resource usage data relevant to the user. In Step S218, the data recorder/translator unit presents or transmits the relevant resource usage data on a World Wide Web page and/or a data file downloadable via FTP.

In Step S208, an Internet server 90 determines whether a user query has been received. If no query has been received, the server may wait. If a query has been received, in Step S210, resource-metering data relevant to the user is retrieved from the database 40. In Step S212, the relevant resource-metering data is presented or transmitted to the user via a World Wide Web page and/or a data file downloadable by ftp.

As discussed, one of the virtues of the present invention is the ability to aggregate usage information. The present invention provides the ability of going to an energy supplier as a single aggregate site or aggregate energy units/capacity. For example, the customer alone may not have as much buying power for its own energy needs, or the customer profile may not be as beneficial in terms of getting a good price. The present invention advantageously permits identification of complimentary loads or energy needs, aggregation of same, and estimation of the aggregate needs to provide the customer the feature of obtaining a larger block of energy for a better price, based on a larger volume/quantity request. That way, the customer can then go out and buy energy with a better high or low factor profile, to obtain energy at a lower price by requesting a larger block of energy, thereby effecting a customer profile having a higher than otherwise load factor.

So, the system allows the customer or user to monitor fairly closely the energy usage of multiple and optionally remote facilities, and then make an aggregate energy usage estimate of the facilities altogether. The user or customer is then in a position to purchase a larger chunk of energy for more facilities at once to achieve economy of scale. Customer groups may be, for example, chains, that may utilize this aggregation feature to aggregate as they see fit. The users or customers may also optionally take groups of customers if they have the information and put them together in any manner, and create a load profile for them, to develop a more satisfying purchase.

For example, a user may be a utility that aggregates together different customers which were never aggregated before. Alternatively, if a discount department store chain has, for example, 300 stores in a predetermined region or regions, the chain itself, or other energy provider could put some or all the stores together alone or in combination with other blocks of stores/energy as a company or a single organization from the perspective of a utility supplier. The supplier can also look at different types of customers. For example, hospitals, schools, and/or churches may be linked by load profile needs so that a supplier may create a predictable, complimentary, energy usage profile of all the entities together.

Resource Management Information Output

Figure 7:
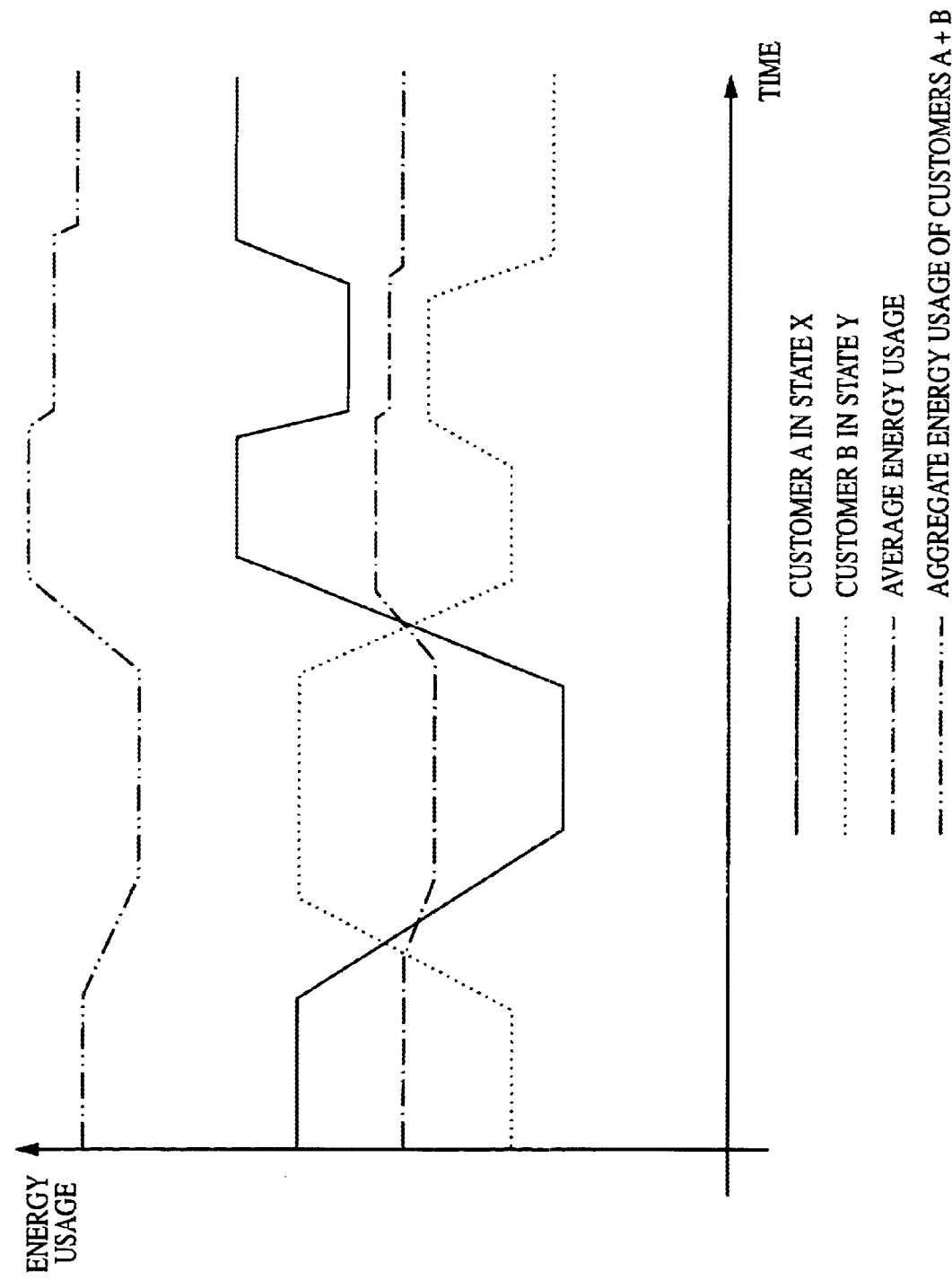
FIG. 7 is a sample energy usage graph for two customers.

FIG. 7 is a sample resource management graph generated to show the energy usage of two hypothetical customers A and B, who live in, for example, States X and Y, respectively. Plainly, A and B may be, for example, two sites of a single customer. Also, A and B may be located in the same state. As can be seen from FIG. 7, customer A and customer B have approximately complementary resource usage requirements over a given time span. Consequently, the average resource usage, illustrated by a line comprised of a dot and a dash combinations, and aggregate resource usage, illustrated by a line comprised of two dots and a dash combinations, of the two customers are substantially linear.

The aggregate resource usage requirements may advantageously be presented to a resource provider, if customer A and customer B unite as a buying block. Customers A and B may thus obtain, for example, a lower resource usage rate than individual resource usage rates. That is, the possible lower rates may result from the substantially linear aggregate usage requirements, which may facilitate the resource provider's planning with respect to resource production and management.

Figure 8:
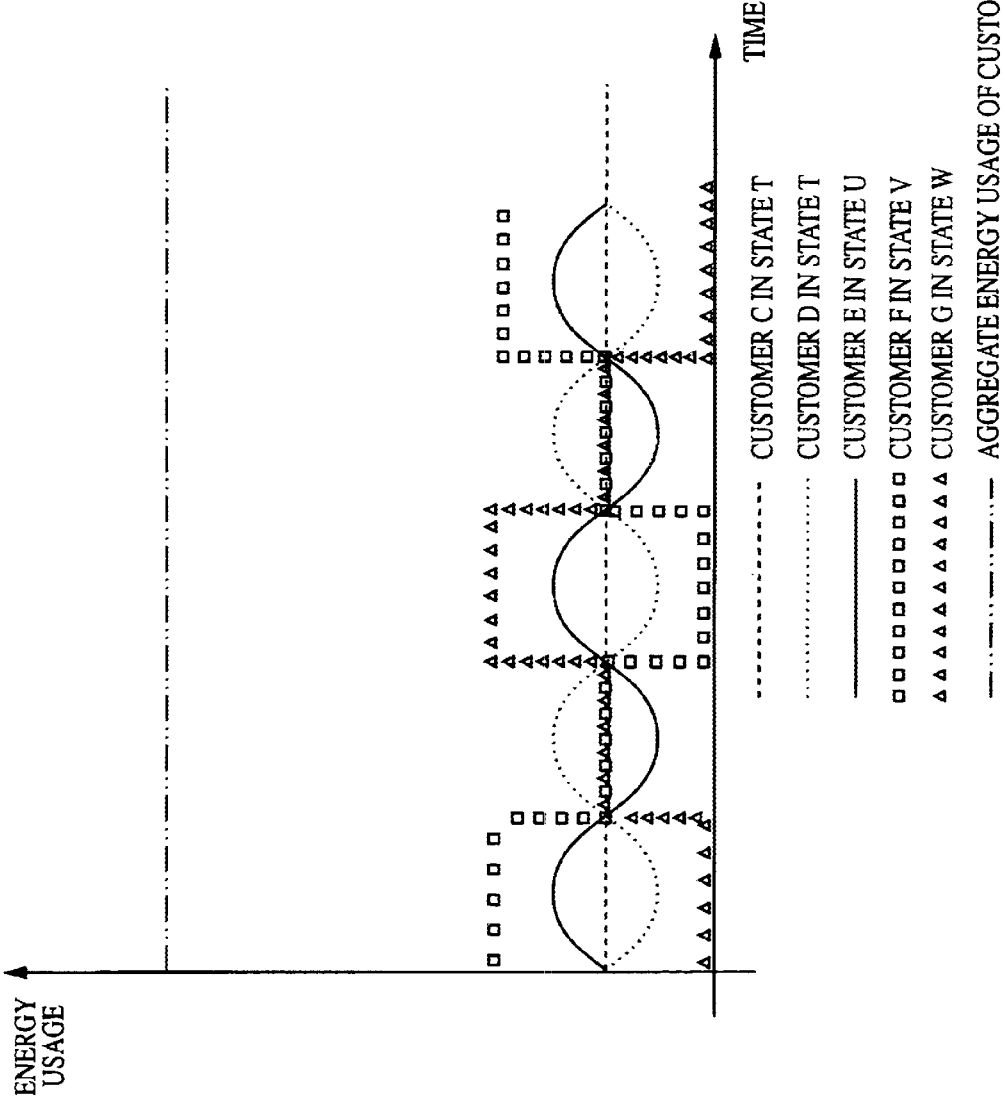
FIG. 8 is another sample energy usage graph for five customers.

FIG. 8 expands the example provided in FIG. 7 to include five customers C, D, E, F, and G. As seen from the graph, all five customers have differing resource usage requirements. Yet, aggregating their usage requirements yields a substantially linear curve, which may be attractive to a prospective resource provider. Customers C, D, E, F, and G may be, for example, five sites of a single customer, five individual customers, two sites of one customer and three sites of another customer, or any other feasible combination. Also, the customers and/or sites may be located in the same state or in different states.

Figure 9:
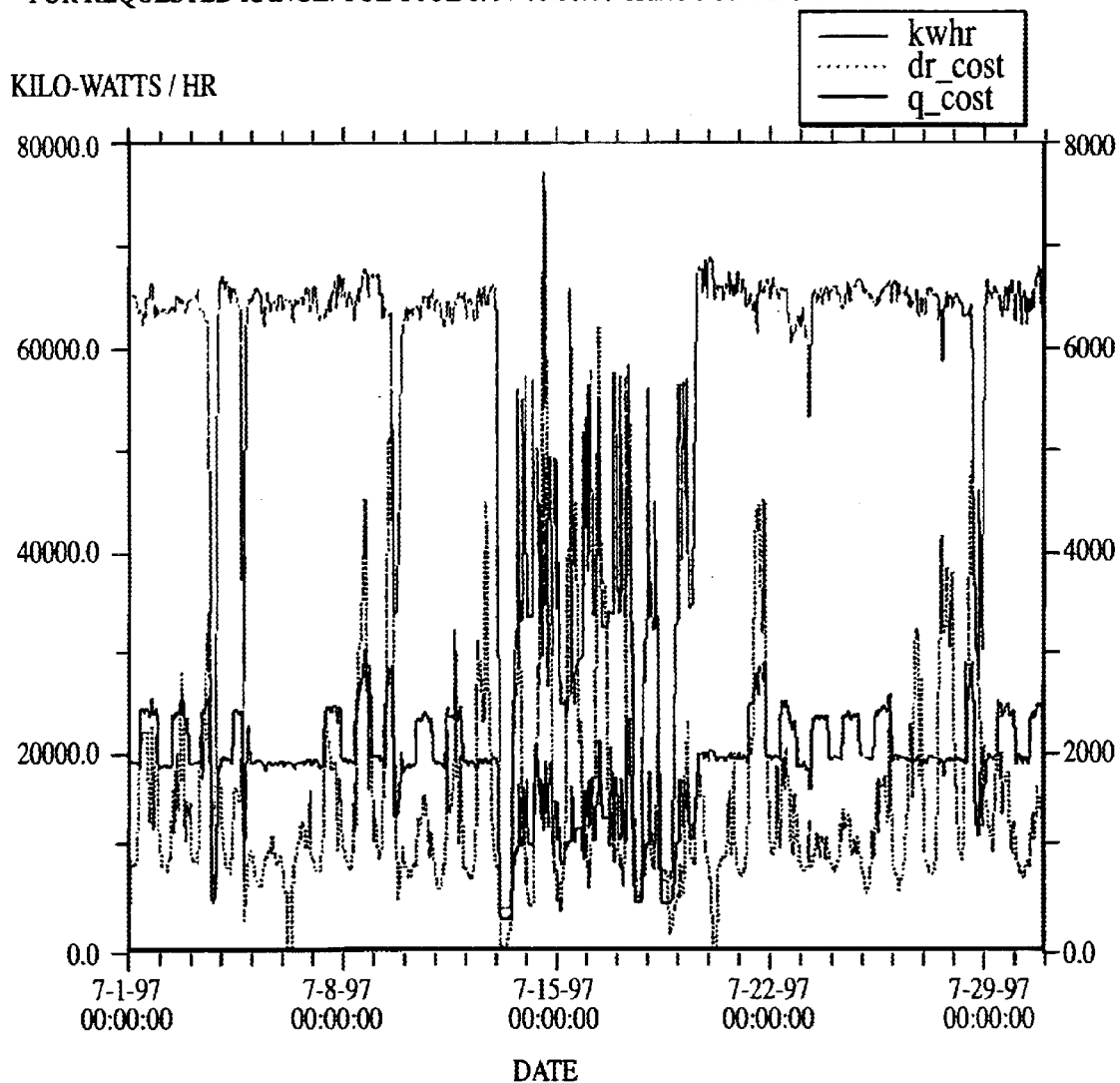
FIG. 9 is a sample energy management information output or report.

FIG. 9 depicts a sample resource management report generated for a large industrial customer that has an interruptible rate. During the time period around July 12–18, there were curtailments and this customer was able to constantly view the real-time portion of the rate structure to determine its economic decision to "buy through" the curtailment or reduce operation. As shown in FIG. 9, the top-most line as seen from the left is the customer's load, the middle line as seen from the left is the real time price signal, and the bottom-most line as seen from the left is its total contracted bill. The customer can discern this information on any interval down to, for example, one hour.

Figure 10:
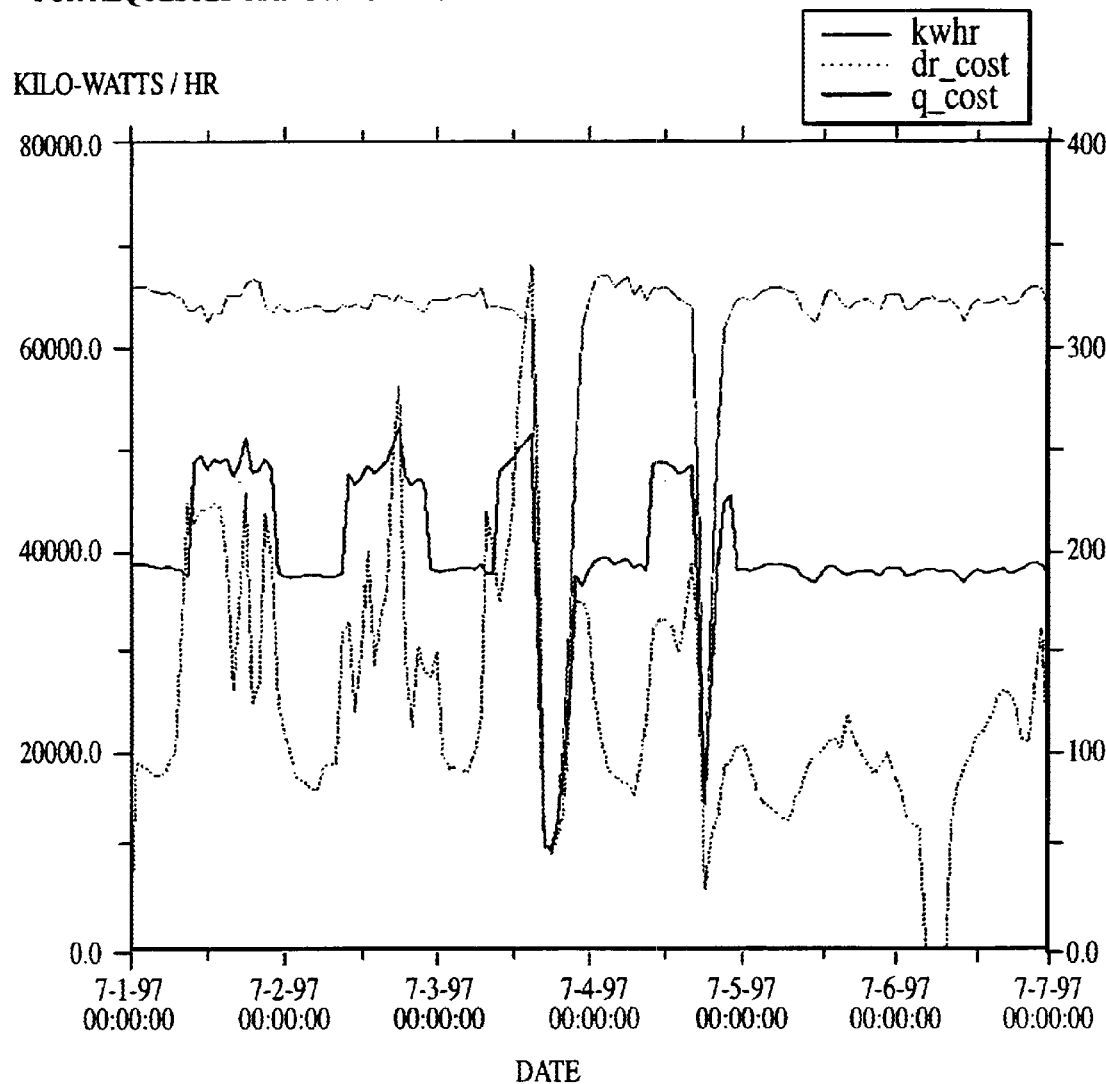
FIG. 10 is another sample energy management information output or report.

FIG. 10 illustrates a sample resource management report generated for the same customer as in FIG. 9 depicted for the previous 24 hours with their load and the two pricing information lines. In addition to the load information, the customer can view estimates for its hourly costs of electric. This allows the customer to make better economic decisions as to its operational profitability.

Figure 11:
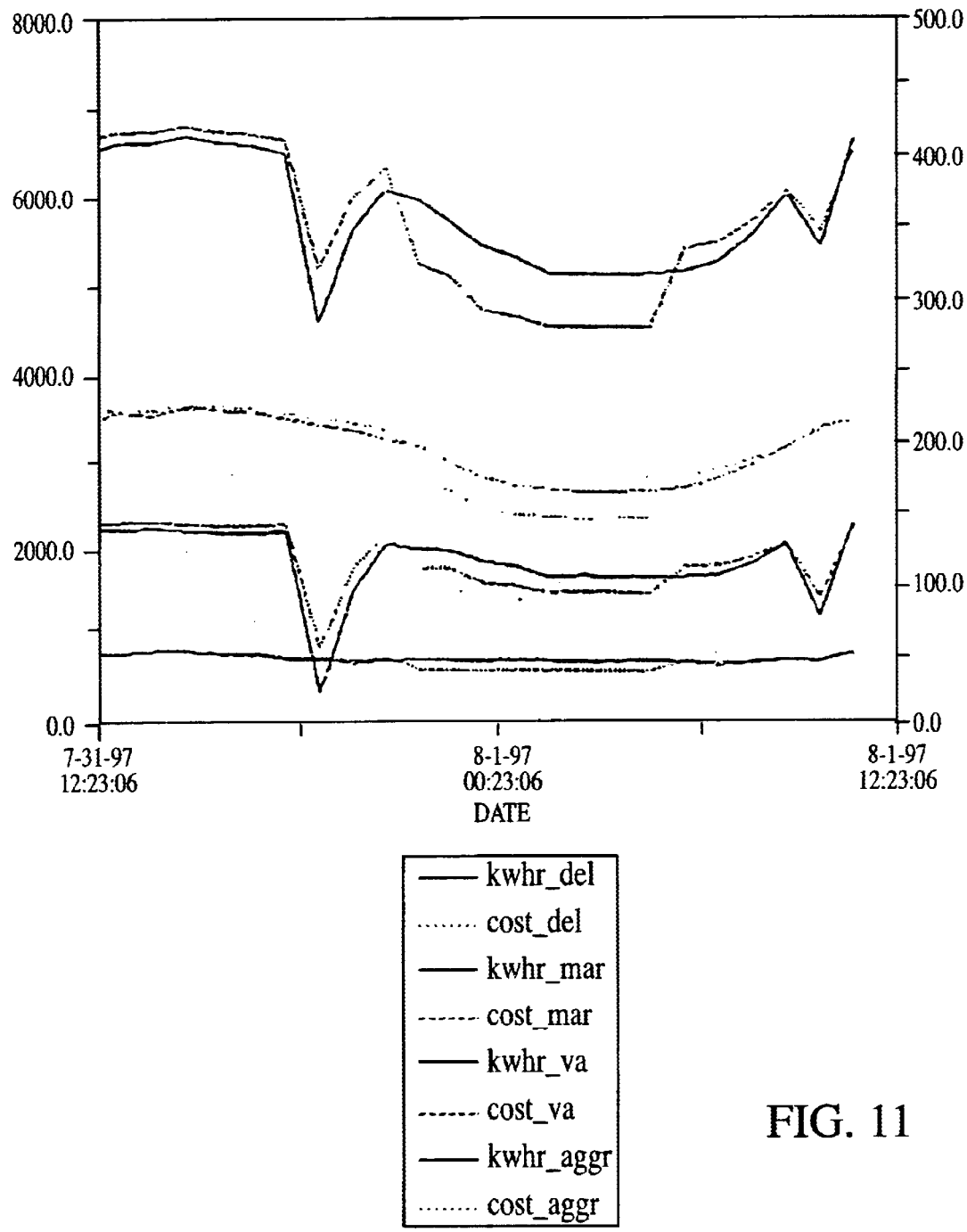
FIG. 11 is still another sample energy management information output or report.

FIG. 11 illustrates a sample resource management report generated for a multi-site enterprise to demonstrate aggregation. The white background in this case illustrates the capability to print without the black background, which is easier on the printer resources. Once again there are load and price curves, in this case for the previous 24 hours. As with all of the load and cost profiles, the information is optionally downloadable in, for example, an ASCII comma delimited file or other file format.

The present invention optionally enables users to approach energy suppliers with the energy information. For example, the present invention provides the ability to tie energy with equipment that monitors, for example, air conditioning units or other loads. Based upon operational characteristics that are being monitored, the present invention alerts the customer whether the equipment is failing or whether it is functioning properly. If the equipment looks like it is going to fail, a maintenance or service person is optionally issued a call to go to that location prior to failure.

For example, an indicator of malfunctioning equipment includes equipment using more or less energy than it would normally use. Each piece of refrigeration equipment, for example, has a band of operational characteristics in which it should operate to function efficiently. Monitored variables include, for example, energy input and temperature output. If the instant system monitors energy in and the temperature out that is characteristic of this device, the system monitors values within that band of operational acceptance.

The more the equipment tends to exceed the operational characteristics, the more likely predictive maintenance will be necessary. Thus, advantageously, not as much time, money or resources are necessary to keep the process running properly. Optionally, for durable goods, such as a refrigerator, instead of calling on or sampling it once a year, or once every six months, an operational check may need only be issued once in a year and half. Maintenance cost may thereby be reduced, while still providing at least the same high quality service to the customer.

In addition, advantageously the savings may be transferred to the customer so it has a pricing center to go to with this offering, to actually produce better quality equipment at a lower price by virtually having this information system in place. At the same time, consumption for the electricity and gas usage of the port is also monitored and collected to understand the customer's total energy needs.

The instant system also advantageously provides a layered approach that facilitates the ability to change or cater the system to specific customer needs. Standard Perl CGI scripts form the core of the system, and are layered on top of standard HTML scripts that create the web page look. Thus, the actual development can go on in parallel, and a different CGI script underneath that HTML page can be created or a different HTML page can be created for the CGI script. Thus, the present invention does not limit the creation or production of one area by any of the other areas.

Further, advantageously the present invention optionally also allows seamless transitioning between databases. The customer need never see the transitioning from, for example, MSQL-type databases to, for example, ORACLE-type databases for providing at least the same functionality while providing more capabilities and/or more programming efficiencies.

Advantageously, the present invention significantly reduces operating costs. Long distance telephone service for costs, for example, 7½ cents per minute to make calls to the standard meters and/or intelligent meters. Each call takes, for example, possibly less than 40 seconds, often between forty seconds and one minute, and possibly greater than one minute depending upon the type of system used. The Vantera-type nodes take a longer time to complete the call than standard meters. The phone usage cost is the largest single component of the operations cost, and by reducing same, significant reductions in cost can be obtained by accessing the nodes through alternative means, such as the Internet or through service providers such as Connectiv Communications.

Sample Computer System

The database/application/administrative web server 50 may, for example, include Sun Ultra Enterprise 6000 Server running, for example, Solaris 2.5.1 operating system, that has six-200 MHZ CPUs, and is scalable up to multi-terabyte or greater storage. Documentation is available via Sun Microsystems online at http://www.sun.com. The server 50 optionally runs at least one of Netscape, Apache, and Oracle, or other suitable software.

The instant invention may include a network/dialer/application server 110, for example, a Compaq server based on a Pentium II processor, running for example, Microsoft Windows NT Server 4.0 for data collection and testing. Documentation and troubleshooting information for Windows NT is available at http://www.microsoft.com. The network server runs, for example, MS SQL Server 6.5, IIS 3.0. Windows NT also permits a shrink-wrapped product where the metering, database, and web publishing software may be installed on an existing NT server at a customer's site, for example, on a corporate intranet enabling those customers who may not feel completely comfortable with the open world of the Internet to easily utilize it.

System interface with other servers is accomplished through, for example, FTP, Oracle, and/or SQULnet. The system interface is optionally built around C-callable libraries, wrapped by a simple standard COM interface to facilitate use in languages, such as, Microsoft Visual Basic or Borland Delphi. Standard database security, standard operating system access rights, standard fire walls and standard secure sockets encryption are all optionally provided.

The Open Platform Information System is capable of providing a variety of formatted file types to any specific server via FTP. Although the preferred format is a flat ASCII data file for which are provided field definitions, the information may alternatively be provided in other file formats, such as, packed decimal format, SAS dataset format, MS Access or any other standard database format, and stored on a physical media, such as diskette, cartridge, and/or CD. HP Vantera-type technology supports data transfer via industry standard TCP and IP protocols.

The present invention uses, for example, an ORACLE database engine. Once again, the storage requirements can be easily supplied at any level within the needs of the service territory by adaption by one of ordinary skill in the art.

Data storage capability is not an issue on the platform. As mentioned above, the present invention employs a powerful database/application/administration web server, such as, a SUN Enterprise 6000 with six CPUs with 600 Gigabytes of information storage capacity. Such a system is optionally easily and cost effectively upgradeable to four tera-bytes or more storage space. An estimate of data storage needs is 2.5 tera-bytes for 100,000 customers with 5 years of data on-line depending on information storage fields and application. Capacity on, for example, a hypermedia system Chimera server, based on a SUN Enterprise 6000 is 600 Gigabytes or more.

It should be noted that the database sizing requirements are based on five years of customer history at an average of one interval per hour. Although, some customers may require more, most customers relate best to the information at the time interval for which they are billed. For this reason, generally, the ISO dispatches and charges in one hour increments. Internet-based solutions, such as Netscape Commerce server, Oracle, Perl 5.003 are also optionally used to accommodate these requirements.

The present invention is also optionally implemented using, for example, at least one of the following programming language(s): Perl 5.003, Visual C++ 5.0, Visual Basic 5.0, GNU C/C++, Java, IIS 3.0 Active Server Pages server-side VBScript and client-side JavaScript. Also, the instant invention optionally includes standard Unix shell scripting CSH, TSH along with NT VBA, Oracle ProC standard libraries, CGI library, or Oracle ProC libraries.

Optionally, all data in the system is time and date stamped by customer and trade channel. In other:words, all the data is optionally broken down into its least common denominator. This archival format allows for the re-construction and/or aggregation of any like type of information. Standard reporting may include line and bar graphs, HTML tables, comma delimited ASCII for import into any spreadsheet or summary bill report.

When the customer wants to retrieve any information, it specifies the piece(s) of information and over what time range it would like to see the information. The data is optionally available for any time period for which the data has been collected. The customer also has the ability to aggregate information, e.g., at least by site, process, region, and state. The customers with multiple sites, may pick them by name. The account number is an optionally available field.

The system logs some and preferably all significant activity by a customer. Optionally, the instant system includes standard tools for assessing demographics by content type to determine needs of different markets by tracking content usage of each market.

The customer can, at the customer's discretion, query the data at any time to generate tables, graphs, and/or raw data. This would be accomplished through, for example, the Web based interface utilizing a standard Web browsers. The customer enters in the date/time and specific pieces and/or aggregates of desired information. The customer than optionally elects the desired report, and receives usage information. Information can be created in a specified report that the customer may choose, for example, a generic flat, comma delimited ASCII file to import directly into any of their systems.

The present invention optionally provides a standard set of reports, which may be customized to an end-user's specifications. That is, although the instant invention includes a library of standard reports, 'customized' reports for the end-user may optionally be provided based on standard mass customization techniques. For example, from a series of standard reports, the end-user would choose those that most closely fit their needs. The customer may retain the option of downloading the raw data from the database to create a user-specific, one.time report on a spreadsheet, database, or the user's own personal reporting system. The belief is that the information belongs to the customer and as such, the customer has access to it as deemed appropriate.

The present invention also enables import and export of data to interface with other applications. For example, a comma delimited flat ASCII file output format of the system would permit such data importing and exporting. A file indicating the file layout of the data may optionally accompany the data file.

Remote meter configuration is handled in a standard Utility Translation Systems MV-90-type format described in detail hereinbelow, via telephone connection, or through current hand-held reading/programming devices. With a Hewlett Packard Vantera-type node, the process is simpler. The activity is handled remotely or on-site via the system's Windows Explorer. Optionally, standard drag and copy techniques to the nodes' configurations once they are addressed via their IP address are permissible according to the instant invention.

Because of the ease by which reconfiguring and general administration of intelligent meters, such as HP Vantera-type nodes, can be accomplished, the instant invention optionally includes the implementation of such Vantera-type technology in places where it makes economic sense, in lieu of other conventional load data recorder technology.

Preferably, all sub-systems that are not Microsoft-based, are Y2K compliant. This is one of the main reasons MV-90-type software, an example of recorder translator, accesses the data and not a database engine. Hourly (1 hour and 15-minute interval) customer data acquisition by phone may optionally be supplemented with a call once a day to capture data missed during that day's hourly readings. This information then optionally submitted to the server in an end-of-day file, which updates for any holes in the previous time periods' interrogations. The system may also optionally be 'loaded' with historical data from earlier periods.

If there are still 'holes' in the data, a standard retread program may be run for a period of time to acquire the missing data. This is done prior to the "rolling over" of the data in the load profile data recorder, which can vary by recorder depending on the time interval being recorded and the storage capacity of the recorder. If the reading fails to provide the information, a call is optionally made to the meter department of the utility provider to make a special pick-up. Presuming the information is acquired in the above-described manner, the data is fed into the database directly or indirectly from a data file generated by the MV-90-type software. At this point in time, if the data is unattainable from these methods, it is left blank. Optionally, "patching" the data, as is common in load research departments and in some meter departments, may be employed to overcome the missing data.

Recorders may be verified for their assigned customer and data measurement parameters. Information is compared to billing data from the customer information system to verify that the information is for the appropriate customer. Customer verification is optionally performed through the utilization of the MV-90-type software's Master Data File in the utility supplier's Meter Department. Customer verification parameters may include, for example, at least one of customer ID, current transformer (CT) and power transformer(PT) ratios, phone numbers, multipliers, off-sets, meter ID, and/or account number.

Database servers 50, for example, SUN Enterprise servers may be backed up regularly, for example, nightly to the back-up storage facility 80, for example, a main tape silo system. Production tapes, by way of illustration, may be copied and stored off-site. The network servers are, for example, Compaq Proliant RAID5 NY servers with mirrored 9-Gig drives. All off-site production tapes optionally may be recovered and reloaded within, for example, six hours. There is also optionally the capability to run some of the production, for example, on leased servers off-site. The data center optionally includes Uninterruptible Power Supplies (UPS), which may be implemented in multiple parallel modules, Battery Back-up systems, Automatic Transfer Switches (ATS) and/or power generator back-up, along with multiple electric circuit feeds. By way of illustration, an Uninterruptable Power Supply (UPS) is a device that provides a clean, reliable source of power to maintain systems in the event of power disturbances and/or interruptions. The UPS device may include a rectifier/charger, inverter and a battery system. The battery system may include one or more, for example, sealed lead-acid (SLA), Nickel-Cadmium (Ni—Cd) and/or Nickel-Metal Hydride (NiMH) batteries. In all there are, for example, five sets of back-up redundancy for the instant invention. Fewer or greater sets are acceptable depending on the need for fault tolerance.

Server/Software

Raw meter data may be manipulated at either the server or client level depending on the appropriateness of the solution based on the need for system integrity, speed and quality before the customer. That is, system level manipulations necessary to be performed on the server will have that solution. Customer end-use manipulation of data will tend to be performed locally at the client to avoid slowing system processing.

The client data manipulation and analysis can be handled through standard program objects written for distributed environments, for example, JAVA applets. The system design also optionally enables the customer to download meter data tables, for example, to a flat ASCII file for input into customer specific applications, e.g., Excel, Lotus and Access databases through, for example, a standard "File Save As" facility in standard browsers. With such an option, advantageously, all of the current and future associated infrastructure features built into the standard Web browser platforms such as the saving of files, e-mail capabilities, and, for example, JAVA applets are automatically encompassed in the system.

The OPIS foundation is optionally a scalable server design providing greater flexibility and convenience as the system grows in number of customers, communication frequency and sequential database fields. The system's capability is flexible enough to parallel systems and/or upgrade information system technologies to accommodate system needs and requirements.

The Energy Management Information Service (EMIS) software include the following features:

energy management features, such as, load profiles and load tables for use by customer to more effectively procure energy and manage energy;

financial management features, such as, real-time pricing, energy cost calculations and cost allocation;

rate analysis features, such as, rate comparison with variable rate structures and pricing options is an enhancement to the billing/energy cost application; and billing features, such as, bill estimation, bill simulation and billing engine (for example, billing and/or payment over the Internet) software applications.

The EMIS/OPIS system foundation is based on the system's capability to acquire data and translate data from virtually every metering device. OPIS translates data from most, and preferably, all known metering devices via its standard universal translation system. This capability is dynamic and keeps pace with new developments as they come into the market. It enables the system to provide customers complete flexibility with regards to the existing and/or planned load data acquisition installation necessary in the new energy markets.

Information integration is transparent to customers. They view an intelligent collection of energy information tools that enables them to buy energy at one or more competitive prices. This configuration also allows the customer to take advantage of and grow with system enhancements and upgrades as technology advances. The system metering and monitoring design includes at least one of these metering technologies:

energy recorders, e.g., data pulse recorders;

energy meters, e.g., all under glass meters and recorders, ABB;

energy monitors, e.g., Square D circuit monitor, PSI Quad4, PML power monitoring;

new intelligent monitoring technologies, e.g., Hewlett-Packard Vantera;

The present invention has the capability to read at least substantially all of the indicated meters and recorders by using Utility Translation Systems' MV-90-type software 30, and forwarding the resulting translations to the database 40 for reporting by the Web application interface. Optionally, a commercially available Translation Interface Module (TIM) is used in connection with the MV-90 software.

The system also optionally interfaces with the Square D 'Circuit Monitor' line of data acquisition products, which is an installed base, especially among larger customers. OPIS optionally includes a Vantera Open Platform information backplane of the data acquisition products for permitting access to load and process other information at the customer and sub-meter level across almost any data collection instrument.

In those cases where the load data recorder is modem enabled, only a PSTN phone line is necessary. Although a dedicated line may be preferred, a splitter to share existing phone lines is also acceptable. In those instances where there is a meter and no recording device, for example, an HP Vantera LPR node to access, accumulate, and provide the necessary load data may be included.

The read capability of OPIS only requires the appropriate transducer be installed to allow for information to flow to the appropriate recording device So that, for example, at least one of kWh, kilowatts(KW), kilo-Volt-Ampere-Reactance (KVAR), MCF, volts, amperes, temperature, and gallons may be read. The system is predicated and designed on an "Open Platform" concept, such that it can access and display any measurable variable.

The standard databases are capable of retrieving, storing, transmitting, and displaying information down to the sub-cycle level, depending on the application. Typically, utility information is collected and stored at the level required for load and billing information, for example, on an hourly interval. For hourly and 15-minute information interrogation intervals, data may be acquired, for example, once an hour via phone (PSTN) connection. Information may be acquired at more discrete intervals down to real-time reads for those applications such as power quality (PQ) which require it, utilizing, for example, the Internet and/or ISDN connections.

Although recorders may be interrogated at virtually any time interval down to real-time, it is a goal to access and provide the information at an appropriate time interval for the customer. Thus, for example, in accordance with one application the Vantera platform reads and displays information at a one-minute interval level. For the power quality applications, for example, information is read and displayed at the millisecond level to perform the PQ analyses for customers.

The present invention optionally and advantageously reads sub-meters. The sub-metered loads are defined as "Shredder1, 2, etc." along with their respective cost curves as shown in FIG. 6. Sub-meter reading is accomplished through the connection of pulse initiators from the sub-metered loads to the load data recorder. Those connections provide the necessary pulse information to the recorder and are identified on the recorder's channels by their end-use. The individual recorders are then accumulated to the enterprise level. At least substantially all data is stored at the channel level such that any configuration and/or amount of channels or submeters can be aggregated in any combination desired to produce aggregated load and cost profiles. Customers with existing regulatory agency-approved Direct Access meters would be "good to go" once the modem and phone line are installed.

As indicated above, the information requested is read at a substantially instantaneous time level. This is accomplished through the use of the appropriate standard measurement equipment (i.e., PQNodes, Square D Circuit Monitors, etc.). The open architecture, characteristic of the instant invention, permits an interface with these systems. Simplistic measurement equipment displays may be presented using, for example, Square D, whereas optional services may be included with the more detailed displays using, for example, a PQNode-based application.

The EMIS/OPIS design is based on the current and anticipated future informational needs of customers. For that specific reason, it is not designed to provide only information regarding electricity usage. The system's design provides the maximum capability and flexibility for the customer in the highly competitive future. The instant invention provides the ability for the customer to combine and aggregate monitored information, be it energy or other processes. For example, gas customers, optionally having combination gas and electric accounts, may monitor and nominate their maximum daily quantity (MDQ) amounts through the Web to their energy suppliers. Similarly, as discussed above, other types of usage information that may be monitored include: band width (copper, optical fiber, etc.), telecommunication time, local telephone service, long distance telephone service, natural gas, gasoline, cable television signals, Internet-type signals, radio usage, wireless communications device usage, cellular communications device usage, digital usage, satellite usage, and the like.

At bottom, optionally, the instant invention reads, aggregates, and/or communicates with the customer, any signal that can be processed and relates the usage information. This includes, but is not limited to temperature, pressure, water level, pounds of steam, power quality, etc. Because the vision is one of providing customers process information such that they or their agents can optimize their operational processes, thereby making them more profitable, the instant invention optionally includes intelligent components, such as Hewlett-Packard Vantera technology which permits the cost-effective access, monitoring, display, and where necessary, control of virtually any information signal a customer may need to optimize operations.

By optionally using existing installed lines and utility installed recorders where possible, the instant invention provides low costs of data acquisition. Recorder information may be accessed via radio, or via linkages with, for example, MetroCom Ricochet™ and cellular digital packet data (CDPD) cellular phone systems.

The Web page addresses provided with a response to a request for information displays the system's present capability to aggregate and display multiple facilities and sub-meters. The system design permits the delay and analysis features to be performed at, for example, the sub-meter level for all data accessed, e.g., interval load and pricing applications.

The flexibility of OPIS is demonstrated throughout, from data acquisition through customer reports. OPIS reads load data recorders in the field, for example, via a phone line, over networks via TCP/IP protocol, and if necessary, from the existing meter translation system database. The data retrieved from the recorders optionally includes at least one of, but is not limited to, kW, kWh, and KVAR, over the desired time intervals. Many common issues related to network acquisition and display of load data have been solved by creating Internet access and display of information while "touching" the customer's network only when necessary at least in part to address customer needs for custom solutions.

Other optional measurement factors read are MCF of gas, temperature, and chiller inlet and outlet water flows, and "live" hourly marginal prices for real-time pricing solutions.

Data is accessed via a standard translation system and transferred to the server and then posed to the Internet. In general terms, it is a multi-tier system whose components include a SQL data warehouse, a metering and business rule abstraction layer, and an HTTP server.

Operations, maintenance and administration requirements may average, for example, two hours per week. There may be non-linear increasing returns to scale benefit for the maintenance and administration as the data acquisition system scales up in size. Flexibility is also present at this level. That is, it may be possible to proceed from initial access of a customer's load information to display of the customer's Internet solution, for example, in less than four hours. This margin may be reduced further by standard dynamic content creation development, whereby data may be available on the Internet as soon as the recorders are "plugged in."

The server capacity is, for example, approximately 500 customers, using a comparatively low-end workstation, and can be simply scaled via introduction of faster hardware, or alternatively across multiple machines. The crossover point from straight serial connection to publish/subscribe technology is in the 2,000 to 3,000 range.

For example, the instant invention may include a SQL system for data storage. But, it is important to note that the instant invention is only very loosely coupled to the brand of SQL server in use. This invention does not rely on proprietary extensions to ANSI SQL standards for performance and functionality. Thus, it is possible to "plug and play" database servers.

Optionally, the instant invention may collect and display power quality information for analysis and resolution drawn to the milli-cycle level or less, for those customers that desire the service.

Given the easy scalability, capacity utilization may be maximized on the instant server. The instant invention's energy management information service may provide load information, for example, over the following time intervals at the indicated frequencies:

Once a month, hourly reads
Once a day, hourly reads
Once an hour, hourly reads
Once every 15 minutes, hourly reads
Once every minute, hourly reads Data Acquisition/Communication OPIS supports standard phone protocol (both PSTN and cellular) and/or Internet Protocol (IP) for data acquisition. The PSTN hardware includes the standard phone line and connection to the modem in the recorder. The modem is part of the recorder hardware and thus, at minimum, the modem must be able to "speak" with the recorder. Alternatively, PCMCIA modem cards, for example, may be used to access HP Vantera-type nodes. The modems may be read available at all baud rates, for example, from 300 and 1200 (typical in most load data recorders) through 33.6K or greater via the phone modem. IP transmission rates are up through 1.5 Mbps via T-1 connectivity, for example, and higher if necessary through greater bandwidth.

Standard PSTN or cellular protocol or Internet Protocol is used as exemplary communication protocol for one or more of the following reasons. PSTN is available virtually everywhere. Such a protocol system may 'translate' information from substantially all of the different data recorders and then publish that information for the customer on its network, over the Internet, as well as in, for example, a comma delimited, downloadable flat ASCII file. This always insures that virtually any customer may access and use its energy information. The means of data distribution ensures that all translation activity is 'transparent' to the customer; all a customer sees is the information it wants. The Internet, by way of example, takes advantage of the most open system for communicating, displaying, and downloading information. Internet Protocol, for example, is the primary protocol for communicating over the Internet today and likely in the future, although the present invention can be easily adapted to accept/utilize other protocols developed in the future.

Utilizing HP Vantera-type technology, the instant invention may optionally communicate in at least the two phone and IP protocols, or by "publish/subscribe" technology. The latter technology permits the movement and dissemination of large amounts of information, that is, when simultaneous information transfer to or from, for example, in excess of 2,000 separate recorders. Vantera-type nodes and associated software provide for the 'broadcast' and 'subscription' of information to, from, and between the nodes over virtually any time interval.

Alternative to Hewlett Packard Vantera-type intelligent recorder/translator units, the network server 110 may include a client program and an intelligent recorder/translator unit may include a server, thereby implementing standard push technology. The client program resident in the network server 110 may capture a resource meter profile and may then periodically initiate requests for information on the network server's behalf from the server of the recorder/translator unit.

The instant invention supports HTTP, FTP, and HTTPS, which layer on TCP/IP from the server to any location in the world. Optionally, the system includes formats compatible with standard Internet browsers, such as Microsoft Internet Explorer and Netscape. Optionally, EMIS/OPIS is fully interlaceable with standard software applications, for example, application suites, such as MS Office. Optionally, native WIN32 NCOM may be used in the applications designs.

At least some of the information and systems is hosted on the servers. The system reads, for example, Meter ID, date and time stamp, kW, kWh, kVAR, MCF, gallons per hour (gph), temperature (° F. or ° C.), pressure, volts, amperes, and/or PQ data. Data may be read on the necessary periodic bases. The recorder is read (via telephone or over the Internet or other customer supported network) and the data, validated by a recorder translator, such as, MV-90, or the on-board Vantera-type system. The read dates can be set to as long as a one-month interval or greater, or as short as a one-minute interval, or less through the software programming in the translation system. It is then set in a file, which is then, for example, FTP'd to the server where it is collected automatically, by way of illustration, in the MS SQL database.

The customer information is stored in the database by channel for each load recorder ID, so that the data is always available in its 'least common denominator' format for any time period. This database optionally may be migrated to an ORACLE-type database as the economics warrant. To this extend, the SQL database is completely portable to an ORACLE-type database and has the capacity of, for example, more than 6,000 customers worth of information. Once the data is in the database, it is available or queryable by, for example, any practicable number of customers. Each customer optionally may have an individually secured page to access and review their data at any time. However, cost-conscious and/or privacy-indifferent customers may opt to share one or more Web pages.

By way of illustration, the instant invention's capability of transmitting data include the following sample read intervals using a phone component or Vantera-type component:
1. monthly
2. weekly
3. daily
4. hourly
5. 15-min
6. 1-min.
7. instantaneous The ability to transmit the data requirements for the customers as indicated here, for example, 100,000 or more may be supported by the use of ORACLE-type database engines along with the Web servers running on, for example, SUN Ultra SPARC 1000 machines. Additionally, the HP Vantera-type technology provides the following capabilities for mass data transmission.

Intelligent Meter Communication Services

The HP Vantera-type communication services, for example, use an advanced commercially available messaging system for network efficient data transfer. Based on industry standard TCP/IP protocols, the messaging services may use publish/subscribe middleware to broadcast information to, from, and between servers and nodes in a true peer-to-peer fashion. Information transmission may be published from any source or pulled from any receiver in a manner similar to accessed information over the World Wide Web.

The Vantera-type communication model is much more efficient in large-scale metering systems than traditional point-to-point connection-oriented systems, which must individually poll each metering node, usually over a serial line. Not only does polling consume much time to establish each connection, but these traditional systems also make it difficult to add new metering nodes, because a central data collector may require reconfiguring or reprogramming to accept changes in the number and/or location of meters.

Use of the power of the HP Vantera-type communication architecture, system and network management is a key component of large scale systems intending utilize tools for system and network management. Commercially available user-friendly tools, such as those of HP Vantera, allow users to download software to nodes over the network from geographically distributed locations, interrogate the network to determine which nodes are online, and browse the node via Web-based tools to determine the state of any node on the network. Using such features as electronic data sheets, node information can be displayed via standard system administration tools.

First-hop Communications Architecture

First-hop communications architecture can also advantageously be achieved through a number of options available to HP Vantera-type nodes. The first option is to put the information directly onto the Internet, for access to either the end user or the service provider. By utilizing the Internet, users may, for example, get direct access to their energy usage, on their corporate intranet.

Using, for example, either the PCMCIA slot, or the RS-232C interface, telephony modems-wireline or wireless-may optionally be integrated into the node. Such modems may communicate through dedicated phone lines, PBXs or cellular stations to communications servers that aggregate and coordinate telephony communications.

Customer Interface and the Internet

The EMIS/OPIS system's intention and existence is based on enabling technology to provide customers convenient access and an easy to use interface for information collection, analysis and display. The system's value proposition providing complex information in a simple, easy-to-understand, management-style format.

The interface technology requires that the customer only have a standard computer network browser, such as MS Internet Explorer and Netscape Navigator, therefore, requiring little or no investment in software. The system also leverages the flexibility and the connectivity of the Internet. This is accomplished by leveraging the functionality that is inherent in standard major browsers, i.e., JAVA applets which optionally provide the customer with information flexibility.

Internet Data Delivery

Once they reach the network communications server/scheduler 110, HP Vantera-type packets may be shipped over the Internet via, for example, standard WAN devices. As "TCP/IP-friendly" packets, HP Vantera-type messages may be shipped over standard data networking equipment, e.g., bridges, routers and/or hubs.

Using, for example, the WAN, geographically distributed communications servers can transport information to enterprise or utility-based applications which use the information for billing, outage awareness and/or other functions.

Advantageously, phone numbers may be verified to ensure that the correct customer is being accessed. Every time the call is placed, a 'handshake' may take place, which verifies, for example, the meter/recorder ID, and/or other translation parameters. Validation takes place on the translator, and the data is then 'reported' to an output file which is then FTP'd to the database server 50. The database server 50 verifies translator (customer) IDs. That data, along with an optional time stamp, is then stored on the database, ready for manipulation.

Data is transferred to the database 40 over networks utilizing, by way of example, Transmission Control Protocol (TCP). TCP, by its very nature, is currently the most robust protocol in terms of reliability due to its inherent integrity checks on data packets, and resending feature if the data packets get damaged, lost, or mis-routed. TCP/IP provides the foundation of over 100 different acceptable standard protocols for governing data movement among computers on a network.

Information service provider servers are monitored and maintained by the network operations personnel. Availability rates may be:
99+% for the Web Server 90, and 99.9+% for the database server(s) 50.

The meter translation system optionally performs periodic or aperiodic security checks with the recorder to ensure that the information is coming from the correct recorder. For example, the security checks may be performed at every interrogation. For example, hourly customer data acquisition by phone may receive a call at the end of the day to capture any data that was missed during the day's hourly readings. That information may then be submitted to the server in, for example, an end-of-day file, which updates for any 'holes' in the previous time periods interrogations. The system can optionally also be "loaded" with historical data from earlier periods.

Optionally, data loss beyond a time period, for example, one day, may be checked with the utility provider's meter department for verification of signal loss. In many cases, given the industrial nature of the customers, signal loss from the phone-based technology resulting from downed private phone lines, typically due to site construction. The instant system also includes the capability to notify the meter department far in advance of their normal identification of data acquisition issues at the customer's site, since they are typically read once a month by the meter reader.

Optionally, the system maintains a database of intervals that need to be called. If necessary, the system optionally may redial meters that need to be reread. Additionally, a user-definable retry cycle allows tuning of metering applications to accommodate more error-prone environments. Except for some components of the MV-90-type recorder translation system, the entire system may optionally be managed via the Internet.

The Web server 90 comprises, for example, a Sun Ultra 2 having Solaris 2.5.1, Standard Sun documentation. Security optionally includes at least one of HTTPS encryption, client certificates and userid/password access levels verified against a standard world wide database. An HP Vantera-type system provides multiple mechanisms to maintain security of customer data.

As to authentication, Vantera-type nodes may be configured to require authentication from any IP address that requests its data. Regarding encryption, because Vantera-type nodes though remote are complete processors, standard programs that reside in them, such as, Node Applications, may use any encryption algorithm to code data that it publishes.

With respect to network security hardware using standard TCP/IP, the Vantera-type communication system may utilize firewalls, routers, and proxy servers for restricting access to unauthorized users. Many alternative optional architectures are possible to the extent that a firewall server limits access from a limited number of known addresses, and/or to a limited number of internal servers within a secure network. For example, standard precautions may include threat monitoring, call-back, and even a standard complete iron box keyable to particular incoming IDs or activity patterns for trapping crackers.

Once the customer is on its secured account, the customer has the option of changing its password. The customer can perform this action any number of times per day or a finite number of times per day.

Exemplary features include: the availability of load and cost curves for electric; load curves, MDQ plots, and nomination capability for gas; power quality; billing information; weather data, which is optionally specific to a customer's locale; real-time energy prices; and/or utility cost management. Linking is as simple as, for example, providing a hot link to a relevant Web site, for example.

A customer may use, for example, Netscape 3.0, Microsoft Internet Explore 3.0 or above, or any other comparable standard computer network browser (e.g., an AOL Web browser) to allow the customer to take advantage of optional frame technology of the pages. The customer can optionally click on "On-line" help, FAQ, e-mail the "Webmaster" and/or call for human interface.

All data is, for example, available in comma delimited flat ASCII files and can be saved using any standard browser "File Save As" function, to a customer PC or network. Alternative, suitable file formats may be implemented in the instant invention, such as Windows NT's Unicode Worldwide Character Standard and IBM OS/390's EBCDIC. Additionally, conversion programs may be included to allow different operating systems to change a file from one code to another. It should be understood that universal appeal of the instant invention may include presentation in languages other than English, which have a larger alphabet than English. Such presentation may require formats for downloadable files that, unlike ASCII, for example, have eight-bit, or more, character sets to accommodate larger non-English alphabets.

The customer may also take advantage of opening up and saving various PC office suite application files through local office applications, e.g., saving the Excel spreadsheet imbedded in the Web page as a spreadsheet on their local machine. Thus, such actions are as easy as "point and click." No programming on the customer's part is required. Further, other data formats may also be used as needed to accommodate customer data processing applications.

EMIS/OPIS can create any variable of interest, for example, averages, on-pk (on-peak), off-pk (off-peak), totals, mins (minimums), and maxs (maximums), as part of the standard system, thereby effecting customization for individual customers. Otherwise, the customization process may be handled by the customer through a standard file download routine.

The system stores at least some of the data at the channel level and optionally creates aggregations as required by the customer. As long as individual channel data is available, it may be the data of choice. At least some of the information is aggregatable according to customer needs. Two or more channels of data may be brought together for aggregation as long as they are common in what they represent.

According to the present invention, EMIS/OPIS includes helping validate bills from an energy provider, optionally signaling the customer when there is an "abnormal" energy consumption, analysis of variable rate options, budgeting and accrual, measurement metrics, such as energy/sq. no. ft., per day, etc. determined by the customer and/or the utility provider, for example, within bounds of the models.

There are, however, some optional enhancements to the various types of analyses that can be readily done for the customer. Chief among them is the ability to accurately forecast energy and demand for customer planning and economic analyses. Other optional enhancements may include data quality indicators, such that the customer not only sees the data, but also understands the quality of the data. Another optional aspect is the "on the fly" what-if scenario analysis tool. That is, "What if I change my load profile—what is the economic impact?"

Implementation thereof is dependent on the specific customers who enter into this program. Those with, for example, LPRs and phone lines need only have, for example, their TIM file provided, and calling out to the recorders may take place from facilities.

The system is optionally completely scalable up through millions of customers or more. A Vantera-type platform may be directed at the enterprise solution with hundreds, thousands, and even millions of nodes installed throughout various enterprises at multiple levels and sub-levels to help provide for overall enterprise operations and economic efficiency. Given its open architecture design and its incredible scalability, an intelligent meter platform, such as the Vantera-type platform, is advantageously the long-range system of choice.

The specific platform on which the system operates is optionally predicated on the number of customers participating and the technologies they are willing to employ to allow for energy and related information to be gathered.

The present invention utilizes load data recorders, which are capable of being interrogated by phone, i.e., modem enabled and optionally are approved by an appropriate regulatory agency. Once the level of that accessibility is determined, modifications may be made to the recorder translator system, such as an MV-90-type translator system to mirror what is present in the energy information provider facilities. This accomplishes a few things. First, it provides some redundancy. Secondly, there is no re-inventing of the wheel. That is, because the configuration standard of MV-90-type recorder translators is known, it will perform the tasks required by the instant invention. Also, it allows energy usage information service providers to work with personnel who are familiar with standard, commercially available recorder translators. It also provides a new experience for customers, who may, as a result, need some 'hand-holding'. This will provide an excellent opportunity for an information service provider to get even closer to its customers. It also allows the solution to fit the specific application and will ultimately provide for cost-effective solutions.

Billing Engine

The OPIS system may provide customer billing estimates based on a customer's existing billing structure and determinants. For specific customers, OPIS optionally creates a billing comparison, for example, a comparison between an existing rate structure and real time pricing. The present invention provides bill estimates for customers ranging in size from 50 kW or less through 60,000 kW or more, on a number, for example, seven different rate structures in at least one or more states. Estimated billing comparisons may be integrated into the system to assist the customer in determining relative value of potential offerings from alternate suppliers.

The instant invention may include optional Internet billing and payment features and/or elements for customers both in the local service territory, and/or those in regions where competitive energy markets exist.

Power Quality

The OPIS system also optionally links with and publishes, for example, power quality information outages, voltage dips and sags, power factor, phase information for power, amps, and volts, and/or harmonics. Standard high-end, mid- and/or low-end monitoring devices in the field today may be used in the instant invention. Optionally, as the monitoring technology for power quality information moves into lower-end recording devices, customers who use such lower-end recording devices may also be provided with power quality information. The key in presenting these more complex activities is the underlying concept of the system whereby an "open" system capable of reading information from a wide variety of input devices and systems is maintained.

Scalability

A basic tenet of the EMIS/OPIS system is its scalability. Therefore, the design is optionally based on a fully scalable platform that may serve up to a million customers with the same logic and capabilities as when it serves only one customer. This same scalability logic optionally flows through the entire information acquisition and delivery system. For example, the Vantera-type enterprise monitoring system is designed to handle and effectively communicate over millions of nodes.

The same relative capabilities may be achieved with the translation system for interrogating meters and recorders in the field. The vision behind the instant invention is also demonstrated by the utilization of the Internet as an exemplary communications platform wherein, for all intents and purposes, there are few, if any, geographical bounds of communications.

Scalability may also be considered when evaluating the system relative to those that run on local PCS. The customer interface with an information distribution system has been optimized, via a Web interface with JAVA applets, so that there is true mass customization, allowing for support of the system software at little or no cost to the customer.

Optionally, the billing engine library may be callable via a program, function, and/or subroutine. On the Windows NT side, the library may be wrapped with an OLE Automation layer for convenience. Depending upon the practicality of Java-based billing, the billing engine may be exposed, for example, via Java Beans.

The billing engine modules are optionally scripted into, for example, PERL scripts for specific customers to whom are provided, for example, Internet-based load and bill information. Rate structures may be evaluated as described in the tariffs, the implementation of which is F straightforward to one of ordinary skill in the art. The customers may optionally be billed on a variety of rate structures that include, for example, customer charges, ratcheted and not-ratcheted demand, time-of-use (TOU) differentiated energy charges, seasonal changes based on billing month and Daylight Saving Time, various surcharges, taxes, and/or special contract riders and/or adjustments.

Optional billing estimations may be provided to major industrial customers that.ate billed on a combined tariff and/or individual real-time energy usage component. ESP 'price curves' may be optionally provided for customers utilizing both tariff rates and/or real-time prices.

Lead load-shifting scenarios are optionally provided, as well as real-time rate comparisons for customers. Aggregation has always been an inherent component of OPIS. EMIS components optionally provide utility cost management information which may include a variety of utility bill consolidations for at least billing, budgeting, variance reporting, accrual, load factor, and/or power factor analyses to assist the customer in its efforts to achieve overall profitability.

The system's front-end is highly flexible. That is, because of HTML and JAVA use, for example, to create the 'look' for the customer, mass customization for customers is possible by taking advantage of these programming tools. There are multiple benefits to this, not the least of which is that system revisions and singular customer revisions can be released, all with the same easy, short production cycle. Optionally and advantageously, no diskettes or CDS need be issued. The changes may be implemented in a manner that is virtual to the customer, all the while, allowing immediate feedback from the customer, via, for example, the browser and Internet technology. The present invention minimizes production costs far below those market participants that deal in stand-alone PC-based systems. The 'look' of the system may literally be changed "on the fly" as necessitated or desired.

Optionally, a link to a database of tariff information may be provided. That information could be provided, for example, to the instant invention on a daily basis via FTP data transfer, for use in a billing module, for example, to feed a bill calculation engine, which would reside on the server. For this, a customers' unique recorder and channel identifier may be needed so that they can be integrated with the customer's load information and presented over the Internet to the customer.

One of ordinary skill in the art will recognize that with respect to the above-described computer network, the scope of the instant invention includes any suitable internet (lower case), i.e., any set of networks interconnected with devices, such as routers, that forward messages or fragments of messages between networks or intranets. Naturally, the Internet (upper case) is one of the largest examples of an internet.

To this end, it is to be understood that the elements of the service provider network, shown for illustrative purposes in FIG. 3 and, more simply, in FIG. 4 as being located in geographic proximity to one another in a substantially centralized processing environment, may alternatively be arranged in a standard distributed processing environment so as to leverage resources, e.g., servers and storage devices, located at two or more sites.

In an alternative embodiment, the above-mentioned computer network may include a virtual private network (VPN), thereby taking advantage of existing PSTN infrastructure while providing a secure and private environment for information exchange regarding resource usage. Advantageously, data sent from the VPN is encrypted, thereby enhancing the privacy of customers. That is, because the VPN includes a tunneling protocol, the instant invention effectively uses the Internet as part of a private secure network. That is, the "tunnel" is the particular path that a given company message or file might travel through the Internet.

In another embodiment, the above-described computer network may alternatively include an extranet, wherein customers may securely exchange large volumes of resource usage data using a standard data exchange format, for example, Electronic Data Interchange. To this extent, an extranet may enable customers to share news of common interest, for example, aggregated resource usage, exclusively with partner companies.

It should be understood that although standard graphical user interface browsers have been discussed, standard text-only browsers, such as Lynx, may be used for UNIX shell and VMS users. Users of such text-only browsers may download comma-delimited ASCII files of, for example, their usage data.

An Appendix is included which contains examples of the reports that are available to the user.

GLOSSARY

Browser A browser is a program that provides a way to look at, read, and even hear all the information on the World Wide Web. Technically, a Web browser is a client program that uses the Hypertext Transfer Protocol (HTTP) to make requests of Web servers throughout the Internet on behalf of the browser user.

Extranet An extranet is a private network that uses the Internet protocols and the public telecommunication system to securely share part of a business's information or operations with suppliers, vendors, partners, customers, or other businesses. An extranet can be viewed as part of a company's intranet that is extended to users outside the company. The same benefits that HTML, HTTP, SMTP, and other Internet technologies have brought to the Internet and to corporate intranets now seem designed to accelerate business between businesses. An extranet requires security and privacy. These require firewall server management, the issuance and use of digital certificates or similar means of user authentication, encryption of messages, and the use of virtual private networks (VPNs) that tunnel through the public network.

Firewall A firewall is a set of related programs, located at a network gateway server, that protects the resources of a private network from users from other networks. A firewall, working closely with a router program, filters all network packets to determine whether to forward them toward their destination. A firewall also includes or works with a proxy server that makes network requests on behalf of workstation users. A firewall is often installed in a specially designated computer separate from the rest of the network so that no incoming request can get directly at private network resources.

FTP File Transfer Protocol (FTP) is one of the suite of protocols that are part of TCP/IP, the client/server program that every Internet server and client PC or workstation uses. FTP has a user command interface for establishing contact with a server, logging in, and sending, receiving, or otherwise changing files. Or, a utility that offers a graphical interface therebetween may be installed. Thus, FTP enables a user to send or to receive files to or from a server. FTP may also be used to update (delete, rename, move, and copy) files at a server.

HTML HTML (Hypertext Markup Language) is the set of "markup" symbols or codes inserted in a file intended for display on a World Wide Web browser. The markup tells the Web browser how to display a Web page's words and images for the user.

HTTP The Hypertext Transfer Protocol (HTTP) is the set of rules for exchanging files (text, graphic images, sound, video, and other multimedia files) on the World Wide Web. Relative to the TCP/IP suite of protocols (which are the basis for information exchange on the Internet), HTTP is an application protocol. Concepts that are part of HTTP include (as its name implies) the idea that files can contain references to other files whose selection will elicit additional transfer requests. Any Web server machine contains, in addition to the HTML and other files it can serve, an HTTP daemon, a program that is designed to wait for HTTP requests and handle them when they arrive. Your Web browser is an HTTP client, sending requests to server machines. When the browser user enters file requests by either "opening" a Web file (typing in a Uniform Resource Locator or URL) or clicking on a hypertext link, the browser builds an HTTP request and sends it to the Internet Protocol address indicated by the URL. The HTTP daemon in the destination server machine receives the request and, after any necessary processing, the requested file is returned.

HTTPS HTTPS (Secure HTTP) allows you to get secure access to a Web site or certain pages on a Web site, using the Secure Socket Layer (SSL).

IP The Internet Protocol (IP) is the method or protocol by which data is sent from one computer to another on the Internet. Each computer (known as a host) on the Internet has at least one address that uniquely identifies it from all other computers on the Internet. When data are sent or received (for example, an e-mail note or a Web page), the data are divided into little chunks called packets. Each of these packets contains both the sender's Internet address and the receiver's address. Any packet is sent first to a gateway computer that understands a small part of the Internet. The gateway computer reads the destination address and forwards the packet to an adjacent gateway that in turn reads the destination address and so forth across the Internet until one gateway recognizes the packet as belonging to a computer within its immediate neighborhood or domain. That gateway then forwards the packet directly to the computer whose address is specified.

IP Address An IP address has two parts: the identifier of a particular network on the Internet and an identifier of the particular device (which can be a server or a workstation) within that network. On the Internet itself, that is, between the routers that move packets from one point to another along the route, only the network part of the address is relevant.

Iron box An iron box is a special environment set up to trap a cracker logging in over remote connections long enough to be traced. It may include a modified shell restricting the cracker's movements in unobvious ways, and "bait" files designed to keep the cracker interested and logged on.

Link Using hypertext, a link is a selectable connection from one word, picture, or information object to another. In a multimedia environment such as the World Wide Web, such objects can include sound and motion video sequences. The most common form of link is the highlighted word or picture that can be selected by the user (with a mouse or in some other fashion), resulting in the immediate delivery and view of another file. The highlighted object is referred to as an anchor. The anchor reference and the object referred to constitute a hypertext link.

Plug-in Plug-in applications are programs that can easily be installed and used as part of your Web browser. A plug-in application is recognized automatically by the browser and its function is integrated into the main HTML file that is being presented.

SSL SSL (Secure Sockets Layer) is a program layer created by Netscape for managing the security of message transmissions in a network. Netscape's idea is that the programming for keeping messages confidential ought to be contained in a program layer between an application (such as a Web browser or HTTP) and the Internet's TCP/IP layers. The "sockets" part of the term refers to the sockets method of passing data back and forth between a client and a server program in a network or between program layers in the same computer.

SQL SQL is a standard interactive and programming language for getting information from and updating a database. Although SQL is both an ANSI and an ISO standard, many database products support SQL with proprietary extensions to the standard language. Queries take the form of a command language that lets a user select, insert, update, find out the location of data, and so forth. There is also a programming interface.

TCP Transmission Control Protocol (TCP) is a method, i.e., a protocol, used along with the Internet Protocol (IP) to send data in the form of message units between computers over the Internet. While IP takes care of handling the actual delivery of the data, TCP takes care of keeping track of the individual units of data (called packets) that a mess age is divided into for efficient routing through the Internet. TCP is known as a connection-oriented protocol, which means that a connection is established and maintained until such time as the message or messages to be exchanged by the application programs at each end have been exchanged. TCP is responsible for ensuring that a message is divided into the packets that IP manages and for reassembling the packets back into the complete message at the other end.

VPN A virtual private network (VPN) is a private data network that makes use of the public telecommunication infrastructure, maintaining privacy through the use of a tunneling protocol and security procedures. A virtual private network can be contrasted with a system of owned or leased lines that can only be used by one company. The idea of the VPN is to give the company the same capabilities at much lower cost by sharing the public infrastructure. Phone companies have provided secure shared resources for voice messages. A virtual private network makes it possible to have the same secure sharing of public resources for data. Companies today are looking at using a private virtual network for both extranets and wide-area intranets. Using a virtual private network involves encrypting data before sending it through the public network and decrypting it at the receiving end. An additional level of security involves encrypting not only the data but also the originating and receiving network addresses.

WWW World Wide Web (WWW or Web) includes all the resources and users on the Internet that are using the Hypertext Transfer Protocol (HTTP) to exchange network-accessible information. Individual Web sites may include graphical user interfaces to the Internet at large.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A computer architecture for global computer network-based monitoring of resource usage for at least one energy provider providing energy to a plurality of resource users, comprising:

at least one resource-metering data recorder, in operation, recording, one of periodically and aperiodically, resource usage data measured by a plurality of resource meters, operatively connected to a plurality of remotely located resource consuming devices;

a recorder translator, in operation, one of periodically and aperiodically, calling said data recorder, and one of periodically and aperiodically, transferring one of directly and indirectly resource usage data from said data recorder to a database; and at least one global computer network server, in operation, receiving a resource usage data query from a user via a global computer network, retrieving the resource usage data of at least two resource users responsive to the resource usage data query entered by the user, aggregating the resource usage data for the at least two resource users, and transmitting resource management information based on the aggregated resource usage data collected from the plurality of resource meters to the user via a global computer network site responsively connected to said global computer network and said at least one global computer network server for analysis by the user of the aggregated resource usage data collected by the at least two resource users provided by the at least one energy provider, said at least one global computer network server including billing software having at least one of a billing estimation and a billing engine for providing the user with billing estimates based on existing billing structures.

2. The computer architecture according to claim 1, wherein said data recorder includes a modem connectable to one of a public switched telephone network and a wireless communications network and is in operative communication with said at least one server, using one of direct dial-up and Internet Protocol.

3. The computer architecture according to claim 1, wherein said at least one server, in operation, presents said resource management information one of to a computer network of the user, to the user via the global computer network, and in a downloadable data file.

4. The computer architecture according to claim 3, wherein said server includes at least one of resource management software having at least one of load profiles and load tables, financial management software having at least one of real-time pricing, energy cost calculation, and cost allocation, and rate analysis software having rate comparison with variable rate structures and pricing options.

5. The computer architecture according to claim 1, wherein said data recorder, in operation, records at least one of a meter identification, data stamp, time stamp, kilowatts, kilowatt-hours, MCF of gas, gph, temperature, pressure, volts, amperes, power quality, water low indication, pounds of steam, and measurement units of electricity, natural gas, gasoline, cable television, band width, telecommunications, short distance service, long distance service, water, Internet usage, radio usage, cellular device usage, digital usage, and satellite usage.

6. The computer architecture according to claim 1, further comprising:
  a resource-metering data recorder/translator unit including a global computer network node and, in operation, recording one of periodically and aperiodically resource usage measured by an associated resource meter,
  wherein said at least one server, in operation, stores the resource usage data recorded by said data recorder/translator unit in said database.

7. The computer architecture according to claim 1, wherein said at least one global computer network server includes a World Wide Web server and said global computer network site includes a World Wide Web site.

8. A method of monitoring resource usage, via a global computer network, for at least one energy provider providing energy to a plurality of resource users, the method comprising the steps of:
  (a) recording, one of periodically and aperiodically, resource usage measured by at least one resource meter, operatively connected to at least one remotely located resource consuming device, using a resource metering data recorder;
  (b) polling, one of periodically and aperiodically, the data recorder for the resource usage data;
  (c) storing, one of periodically and aperiodically, the resource usage data in a database;
  (d) repeating said recording step (a), said polling step (b), and said storing step (c);
  (e) determining, simultaneously to said repeating step (d), whether a query from a user is received at a global computer network server;
  (f) retrieving, when a query is received, resource usage data relevant to the user and at least two resource users from the database;
  (g) aggregating the resource usage data for the at least two resource users; and
  (h) transmitting resource management information based on the aggregated resource usage data to the user one of at a global computer network interface site and in a downloadable data file, the global computer network interface site and the downloadable file being responsively connected to the global computer network server for analysis by the user of the aggregated resource usage data collected by the at least two resource users provided by the at least one energy provider; and
  (i) transmitting billing estimates to the user based on existing billing structures.

9. The method according to claim 8, further comprising the step of repeating said determining step (e), said retrieving step (f), said aggregating step (g), and said transmitting step (h).

10. The method according to claim 8, wherein said recording step (a) includes recording at least one of a meter identification, data stamp, time stamp, kilowatts, kilowatt-hours, MCF of gas, gph, temperature, pressure, volts, amperes, power quality, water low indication, pounds of steam, and measurement units of electricity, natural gas, gasoline, cable television, band width, telecommunications, short distance service, long distance service, water, Internet usage, radio usage, cellular device usage, digital usage, and satellite usage.

11. The method according to claim 8, wherein said server includes at least one of resource management software having at least one of load profiles and load tables, financial management software having at least one of real-time pricing, energy cost calculation, and cost allocation, rate analysis software having rate comparison with variable rate structures and pricing options, and billing software having at least one of billing estimation and a billing engine.

12. A computer architecture for global computer network-based monitoring of resource usage for at least one energy provider providing energy to a plurality of resource users, comprising:
  at least one resource-metering data recorder/translator unit including a global computer network node and, in operation, recording, one of periodically and aperiodically, resource usage data measured by a plurality of resource meters operationally connected to a plurality of remotely located resource consuming devices; and
  at least one global computer network server, in operation, storing the resource usage data recorded by said data recorder/translator unit, receiving a resource usage data query from a user via a global computer network, retrieving the resource usage data for at least two resource users responsive to the resource usage data query entered by the user, aggregating the resource usage data for the at least two resource users and transmitting resource management information based on the aggregated resource usage data to the user via a global computer network site responsively connected to said global computer network and said at least one global network server for analysis by the user of the aggregated resource usage data collected by the at least two resource users provided by the at least one energy provider, said at least one global computer network server including billing software having at least one of a billing estimation and a billing engine for providing the user with billing estimates based on existing billing structures.

13. The computer architecture according to claim 12, wherein said data recorder/translator unit includes a modem connectable to one of a public switched telephone network and a wireless communications network, and, in operation, communicates with said at least one server using one of direct dial-up, Internet Protocol, and a publish/subscribe network communication protocol.

14. The computer architecture according to claim 12, wherein said data recorder/translator unit includes a World Wide Web site, which in operation displays at least one of the resource usage data recorded by said data recorder/translator unit and the energy management information.

15. The computer architecture according to claim 12, wherein said at least one server, in operation, presents said resource management information one of to a network of the user, to the user via the global computer network, and in a downloadable data file.

16. The computer architecture according to claim 12, wherein said server includes at least one of resource management software having at least one of load profiles and load tables, financial management software having at least one of real-time pricing, energy cost calculation, and cost allocation, and rate analysis software having rate comparison with variable rate structures and pricing options.

17. The computer architecture according to claim 12, wherein said data recorder/translator unit, in operation, records at least one of a meter identification, data stamp, time stamp, kilowatts, kilowatt-hours, MCF of gas, gph, temperature, pressure, volts, amperes, power quality, water low indication, pounds of steam, and measurement units of electricity, natural gas, gasoline, cable television, band width, telecommunications, short distance service, long distance service, water, Internet usage, radio usage, cellular device usage, digital usage, and satellite usage.

18. The computer architecture according to claim 12, further comprising:
   a resource-metering data recorder, in operation, recording, one of periodically and aperiodically, resource usage data measured by an associated resource meter; and
   a recorder translator, in operation, calling, one of periodically and aperiodically, said data recorder, and transferring, one of periodically and aperiodically, the resource usage data from said data recorder to said database.

19. The computer architecture according to claim 12, wherein said at least one global computer network server includes a World Wide Web server and said global computer network site includes a World Wide Web site.

20. A method of monitoring resource usage, via a global computer network, for at least one energy provider providing energy to a plurality of resource users, the method comprising the steps of:
   (a) recording, one of periodically and aperiodically, resource usage data measured by at least one resource meter, operatively connected to at least one remotely located resource consuming device, using a resource usage data recorder/translator unit;
   (b) publishing, one of periodically and aperiodically, the recorded resource usage data on a global computer network via a publish/subscribe network communication protocol, using the data recorder/translator unit;
   (c) subscribing, one of periodically and aperiodically, to the published resource usage data, using at least one global computer network server;
   (d) storing, one of periodically and aperiodically, the subscribed resource usage data to a database;
   (e) repeating said recording step (a), said publishing step (b), said subscribing step (c), and said storing step (d);
   (f) determining, simultaneous to said repeating step (e), whether a query from a user is received at the at least one server;
   (g) retrieving, when a query is received, resource usage data relevant to at least two resource users from the database;
   (h) aggregating the resource usage data for the at least two users; and
   (i) transmitting resource management information based on the aggregated resource usage data to the user one of at a global computer network site and in a downloadable data file for analysis by the user of the aggregated resource usage data collected by the at least two resource users provided by the at least one energy provider, the global computer network site and the downloadable data file being responsively connected to the global computer network server; and
   (j) transmitting billing estimates to the user based on existing billing structures.

21. The method according to claim 20, further comprising the step of repeating said determining step (f), said retrieving step (g), said aggregating step (h), and said transmitting step (i).

22. The method according to claim 20, wherein said recording step (a) includes recording at least one of a meter identification, data stamp, time stamp, kilowatts, kilowatt-hours, MCF of gas, gph, temperature, pressure, volts, amperes, power quality, water low indication, pounds of steam, and measurement units of electricity, natural gas, gasoline, cable television, band width, telecommunications, short distance service, long distance service, water, Internet usage, radio usage, cellular device usage, digital usage, and satellite usage.

23. The method according to claim 20, wherein said server includes at least one of resource management software having at least one of load profiles and load tables, financial management software having at least one of real-time pricing, energy cost calculation, and cost allocation, rate analysis software having rate comparison with variable rate structures and pricing options, and billing software having at least one of billing estimation and a billing engine.

24. A computer architecture for computer network-based monitoring of resource usage, comprising:
   at least one resource-metering data recorder/translator unit including a computer network node and, in operation, recording, one of periodically and aperiodically, resource usage data collected by a plurality of resource meters operationally connectable to a plurality of remotely located resource consuming devices, respectively; and
   at least one computer network server, in operation, storing the resource usage data recorded by said at least one resource-metering data recorder/translator unit, receiving a resource usage data query from a user via a computer network, retrieving the resource usage data responsive to the resource usage data query entered by the user, and aggregating resource management information based on the resource usage data collected from the plurality of resource meters, transmitting the aggregated resource usage data to the user via a computer network site responsively connected to said at least one computer network server and said computer network, and transmitting billing estimates to the user based on existing billing structures.

25. A computer implemented process of computer network-based monitoring of resource usage assisting a user in the purchase of resources, comprising the steps of:
 (a) recording, one of periodically and aperiodically, resource usage data measured by a plurality of resource meters operationally connectable to a plurality of remotely located resource consuming devices, respectively;
 (b) receiving a resource usage data query from a user via a computer network, and correlating the resource usage data responsive to the resource usage data query;
 (c) aggregating the correlated resource usage data;
 (d) transmitting the aggregated resource usage data to the user via a computer network site responsively connected to said at least one computer network server and said computer network; and
 (e) evaluating, by the user, the aggregated resource usage data; and
 (f) purchasing the resources responsive to the aggregated resource usage data for said plurality of remotely located resource consuming devices.

26. In a computer architecture for global computer network-based monitoring of resource usage including at least one resource-metering data recorder/translator recording resource usage data collected by resource meters connected to remote located consuming device, a method comprising the steps of:
 (a) monitoring energy use of a specific resource over the global computer network;
 (b) evaluating the energy use of a specific resource responsive to said monitoring step; and
 (c) determining whether maintenance is required for the specific resource responsive to the energy use of the specific resource.

27. A computer system including software architecture reporting resource usage implemented by the computer system, comprising:
 financial management software implementing at least one of real-time pricing, energy cost calculation and cost allocation;
 resource management software means for implementing at least one of load profiles and load tables;
 rate analysis software means for implementing rate comparison with variable rate structures and pricing options, and;
 billing software means for implementing at least one of billing estimation and a billing engine.

28. The computer system according to claim 27, wherein said computer system further comprising the ability to implement at least one of:
 tracking different markets needs, aggregating energy information, combining gas, electric and power information, nominating maximum daily quantities, accessing and displaying any measurable data, signaling abnormal energy consumption, forecasting energy use, identifying of complementary loads and analyzing.

29. The computer system according to claim 27, wherein said computer system further implementing the function of:
 creating load and cost curves for energy use; creating maximum daily quality plots of energy and gas; power quality analysis of outages, voltage dips and sags, power factor, phase information for power, amps, and volts, and/or harmonics; billing information which creates billing comparisons, bill estimation, bill simulation and includes a billing engine (for example, billing and/or payment over the Internet); and weather data, which is optionally specific to at least one of a customer's locale, real-time energy prices and/utility cost management.

30. The computer system according to claim 27, wherein said computer system further implementing the function of:
 weather data, which is specific to at least one of a customer's locale, real-time energy prices and utility cost management.

31. An arrangement for globally monitoring resource usage for at least one energy provider providing energy to a plurality of resource users, comprising:
 a plurality of resource meters operatively coupled to remotely located resource consuming devices, said plurality of resource meters measuring resource usage data from said resource consuming devices;
 at least one resource-metering data recorder for recording the measured resource usage data; and
 at least one global computer network server configured to:
  receive the resource usage data from said at least one resource-metering data recorder and store the resource usage data in a database system,
  receive a resource usage data query from a user via a global computer network,
  retrieve resource usage data for at least two resource users responsive to the resource usage data query,
  aggregate the resource usage data retrieved for the at least two resource users, and
  transmit resource management information based on the aggregated resource usage data to the user via said global computer network, and transmit billing estimates for the user based on existing billing structures.

32. The arrangement of claim 31, wherein said global computer network server is further configured to optimize the aggregated resource usage data.

33. The arrangement of claim 32, wherein the global computer network server optimizes the aggregated resource usage data by removing the resource usage data of one or more of the at least one additional users.

34. The arrangement of claim 32, wherein the global computer network server optimizes the aggregated resource usage data by retrieving resource usage data from different resource users.

35. The arrangement of claim 32, wherein the global computer network server optimizes the aggregated resource usage data by removing the resource usage data of one or more of the resource users, and retrieving resource usage data from different resource users.

36. The arrangement of claim 32, wherein the optimized aggregate resource usage data represents a substantially constant rate of average resource consumption for the resource users and the at least one additional user by said plurality of resource consuming devices.

37. A method of globally monitoring resource usage for at least one energy provider providing energy to a plurality of resource users, the method comprising the steps of:

measuring resource usage data from a plurality of resource consuming devices;

recording the measured resource usage data;

transmitting the recorded resource usage data to a global computer network server;

storing the resource usage data in a database system;

receiving, by the global computer network server, a resource usage data query from a user via a global computer network;

retrieving, by the global computer network server, resource usage data for at least two resource users responsive to the resource usage data query;

aggregating the resource usage data retrieved for the at least two resource users; and transmitting resource management information and billing estimates based on the aggregated resource usage data to the user via the global computer network.

38. The method claim 37, further comprising a step of optimizing the aggregated resource usage data prior to performing the step of transmitting.

39. The method of claim 38, wherein the step of optimizing further includes the steps of:

removing the resource usage data of one or more of the at least two resource users; and repeating the step of aggregating.

40. The method of claim 38, wherein the step of optimizing further includes the steps of:

retrieving resource usage data from different resource users; and repeating the step of aggregating.

41. The arrangement of claim 38, wherein the step of optimizing further includes the steps of:

removing the resource usage data of one or more of the additional users;

retrieving resource usage data from different users; and repeating the step of aggregating.

42. A system for globally monitoring resource usage for at least one energy provider providing energy to a plurality of resource users, comprising:

a plurality of resource meters operatively coupled to remotely located resource consuming devices, said plurality of resource meters measuring resource usage data from said resource consuming devices;

at least one resource-metering data recorder for recording the measured resource usage data; and at least one global computer network server configured to:
receive the resource usage data from said at least one resource-metering data recorder and store the resource usage data in a database system,
receive a resource usage data query from a user via a global computer network,
retrieve resource usage data for at least two resource users responsive to the resource usage data query,
aggregate the resource usage data retrieved for the at least two resource users,
transmit resource management information based on the aggregated resource usage data to the user via said global computer network, and
transmit billing estimates for the user based on existing billing structures;

wherein the resource management information includes a chart displaying information relating to kilovolt ampere reactance (kVAr), power factor, real-time pricing cost, and contract rate cost.

43. A system for globally monitoring resource usage for at least one energy provider providing energy to a plurality of resource users, comprising:

a plurality of resource meters operatively coupled to remotely located resource consuming devices, said plurality of resource meters measuring resource usage data from said resource consuming devices;

at least one resource-metering data recorder for recording the measured resource usage data; and at least one global computer network server configured to:
receive the resource usage data from said at least one resource-metering data recorder and store the resource usage data in a database system,
receive a resource usage data query from a user via a global computer network,
retrieve resource usage data for at least two resource users responsive to the resource usage data query,
aggregate the resource usage data retrieved for the at least two resource users,
transmit resource management information based on the aggregated resource usage data to the user via said global computer network, and
transmit billing estimates for the user based on existing billing structures;

wherein the resource management information includes a chart displaying resource usage by each resource user and the aggregated resource usage.

44. The computer architecture of claim 1, wherein said at least two resource users are remotely located from each other.

45. The computer architecture of claim 1, wherein said at least two resource users receive the resource from different energy providers.

46. The computer architecture of claim 12, wherein said at least two resource users are remotely located from each other.

47. The computer architecture of claim 12, wherein said at least two resource users receive the resource from different energy providers.

48. The arrangement of claim 31, wherein said at least two resource users are remotely located from each other.

49. The arrangement of claim 31, wherein said at least two resource users receive the resource from different energy providers.

50. The system of claim 42, wherein said at least two resource users are remotely located from each other.

51. The system of claim 42, wherein said at least two resource users receive energy from different energy providers.

* * * * *